(12) United States Patent
Oh et al.

(10) Patent No.: US 12,016,078 B2
(45) Date of Patent: Jun. 18, 2024

(54) ELECTRONIC DEVICE SUPPORTING MULTIPLE SIMS AND METHOD FOR OPERATING THE SAME

(71) Applicant: SAMSUNG ELECTRONICS CO., LTD., Suwon-si (KR)

(72) Inventors: Jungmin Oh, Suwon-si (KR); Sanghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 17/507,081

(22) Filed: Oct. 21, 2021

(65) Prior Publication Data

US 2022/0132296 A1    Apr. 28, 2022

Related U.S. Application Data

(63) Continuation of application No. PCT/KR2021/014622, filed on Oct. 19, 2021.

(30) Foreign Application Priority Data

Oct. 22, 2020 (KR) .................. 10-2020-0137605

(51) Int. Cl.
H04W 8/18 (2009.01)
H04W 88/06 (2009.01)
(52) U.S. Cl.
CPC .............. H04W 8/18 (2013.01); H04W 88/06 (2013.01)
(58) Field of Classification Search
CPC ................................ H04W 8/18; H04W 88/06
(Continued)

(56) References Cited

U.S. PATENT DOCUMENTS

2016/0112084 A1    4/2016  Parron et al.
2017/0303290 A1   10/2017  Wu et al.
(Continued)

FOREIGN PATENT DOCUMENTS

CA      3 047 858 A1     8/2018
KR   10-2019-0126173    11/2019
(Continued)

OTHER PUBLICATIONS

International Search Report and Written Opinion dated Jan. 18, 2022 in corresponding International Application No. PCT/KR2021/014622.

(Continued)

*Primary Examiner* — Qutbuddin Ghulamali
(74) *Attorney, Agent, or Firm* — NIXON & VANDERHYE P.C.

(57) ABSTRACT

According to various embodiments, an electronic device may comprise at least one processor, and an RF circuit configured to process a data packet associated with a first SIM connected to the at least one processor and a data packet associated with a second SIM connected to the at least one processor. The at least one processor may be configured to: establish a first PDU session corresponding to the first SIM, establish a second PDU session corresponding to the second SIM, store first information for the first PDU session, based on a network slice type of the first PDU session being a specified first type, and process a first data packet associated with the first SIM using the RF circuit while deferring execution of an operation associated with the second SIM based on a processing request for the first data packet associated with the first SIM corresponding to the stored first information.

14 Claims, 21 Drawing Sheets

(58) Field of Classification Search
USPC .......................................................... 455/418
See application file for complete search history.

(56) References Cited

U.S. PATENT DOCUMENTS

| | | |
|---|---|---|
| 2019/0124561 A1 | 4/2019 | Faccin et al. |
| 2020/0068647 A1 | 2/2020 | Jha et al. |
| 2020/0120585 A1 | 4/2020 | Kumar et al. |
| 2020/0245292 A1* | 7/2020 | Huang ................. H04W 68/12 |
| 2020/0336935 A1* | 10/2020 | Takakura .............. H04W 76/15 |

FOREIGN PATENT DOCUMENTS

| | | |
|---|---|---|
| KR | 10-2020-0011245 | 2/2020 |
| KR | 10-2020-0029462 | 3/2020 |
| KR | 10-2020-0068668 | 6/2020 |
| WO | 18/064002 | 4/2018 |
| WO | 2018/064002 | 4/2018 |
| WO | 20/191524 | 10/2020 |

OTHER PUBLICATIONS

Intel, "PLMN selection and cell (re-)selection for dual-registration mode", C1-181156, 3GPP TSG CT WG1 #109, Feb. 19, 2018.
Lenovo, "KI #2, New Sol: MT service delivery when multiple USIMs are registered in the same serving PLMN", S2-2006020, 3GPP TSG SA WG2 #104E, Sep. 2, 2020.
Intel, "Enhancements to Dual Registration mode of operation", S2-186370, 3GPP TSG SA WG2 #12 8, Jun. 26, 2018.
Extended European Search Report dated Dec. 15, 2023 for EP Application No. 21883207.9.

\* cited by examiner

ELECTRONIC DEVICE SUPPORTING MULTIPLE SIMS AND METHOD FOR OPERATING THE SAME

CROSS-REFERENCE TO RELATED APPLICATIONS

This application is a continuation of International Application No. PCT/KR2021/014622 designating the United States, filed on Oct. 19, 2021, in the Korean Intellectual Property Receiving Office and claiming priority to Korean Patent Application No. 10-2020-0137605, filed on Oct. 22, 2020, in the Korean Intellectual Property Office, the disclosures of which are incorporated by reference herein in their entireties.

BACKGROUND

Field

The disclosure relates to an electronic device supporting a plurality of subscriber identification modules (SIMs) and a method for operating the same.

Description of Related Art

In a wireless communication system, an electronic device (e.g., user equipment (UE)) may access a wireless communication network and use a voice communication or data communication service in a fixed position or on the move. To provide a communication service to an electronic device, an appropriate authentication process is required. In general, a universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and universal subscriber identity module (USIM) in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an appropriate authentication process may be performed with the server the mobile network operator, which stores the same value, using to the international mobile subscriber identity (IMSI) value stored in the UICC and the encryption key value for authentication. After the appropriate authentication process is performed, the wireless communication service may be used.

An electronic device may support two or more SIMs. An electronic device supporting two SIMs may be called a dual SIM electronic device, and an electronic device supporting multiple SIMs may be called a multi-SIM electronic device. A dual SIM or multi-SIM electronic device may support a plurality of SIMs. Each SIM may be associated with a different subscription. Signals associated with the plurality of SIMs may be transmitted/received to and from the network by the electronic device. A mode in which signals individually associated with the plurality of SIMs cannot be simultaneously transmitted/received may be referred to as a dual SIM dual standby (DSDS) mode. In the DSDS mode, while signals are transmitted or received based on either of the SIMs, signals cannot be transmitted or received based on the other SIM and, thus, the other SIM may stay in standby mode.

Meanwhile, a most prominent feature of 5G networks lies in adopting network slicing for radio access networks (RANs) and core networks (CNs). This is intended for bundling up network resources and network functions into a single independent network slice depending on individual services, allowing for application of network system function and resource isolation, customization, independent management and orchestration to mobile communication network architectures. The use of such network slicing enables offering 5G services in an independent and flexible way by selecting and combining 5G system network functions according to services, users, business models, or such references.

In an electronic device supporting multiple SIMs, there may be established a data session (e.g., packet data unit session, hereinafter, a 'PDU session') corresponding to a network slice of ultra-reliable and low-latency communications (hereinafter, URLLC) in association with any one SIM. When the electronic device operates in the DSDS mode, the SIM for the URLLC service and the other SIM may time-divisionally share RF resources in the electronic device. If there is no consideration of priority among the multiple SIMs, there is a possibility that the processing of data packets of the SIM for the URLLC service is delayed by an operation associated with the other SIM. Accordingly, there is a possibility that the URLLC service is delayed.

SUMMARY

Embodiments of the disclosure provide an electronic device and a method for operating the same that may preferentially allocate an RF resource to data packet processing while deferring the operation for the other SIM when data packet processing associated with the URLLC service based on a specific SIM is requested.

According to an example of various embodiments, an electronic device may comprise: at least one processor, and a radio frequency (RF) circuit configured to process a data packet associated with a first subscriber identification module (SIM) connected to the at least one processor and a data packet associated with a second SIM connected to the at least one processor. The at least one processor may be configured to: establish a first packet data unit (PDU) session corresponding to the first SIM, establish a second PDU session corresponding to the second SIM, store first information for the first PDU session based on a network slice type of the first PDU session being a specified first type, and process a first data packet associated with the first SIM using the RF circuit while deferring execution of an operation associated with the second SIM, based on a processing request for the first data packet associated with the first SIM corresponding to the stored first information.

According to an example of various embodiments, a method for operating an electronic device including at least one processor and a radio frequency (RF) circuit configured to process a data packet associated with a first subscriber identification module (SIM) connected to the at least one processor and a data packet associated with a second SIM connected to the at least one processor may comprise: establishing a first packet data unit (PDU) session corresponding to the first SIM, establishing a second PDU session corresponding to the second SIM, storing first information for the first PDU session, based on a network slice type of the first PDU session being a specified first type, and processing a first data packet associated with the first SIM using the RF circuit while deferring execution of an operation associated with the second SIM, based on a processing request for the first data packet associated with the first SIM corresponding to the stored first information.

According to an example of various embodiments, there may be provided an electronic device and a method for operating the same, which may preferentially allocate an RF resource to data packet processing while deferring the operation for another SIM when data packet processing associated with the URLLC service based on a specific SIM is requested. Accordingly, it is possible to avoid delay of the URLLC service due to the operation of the other SIM.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
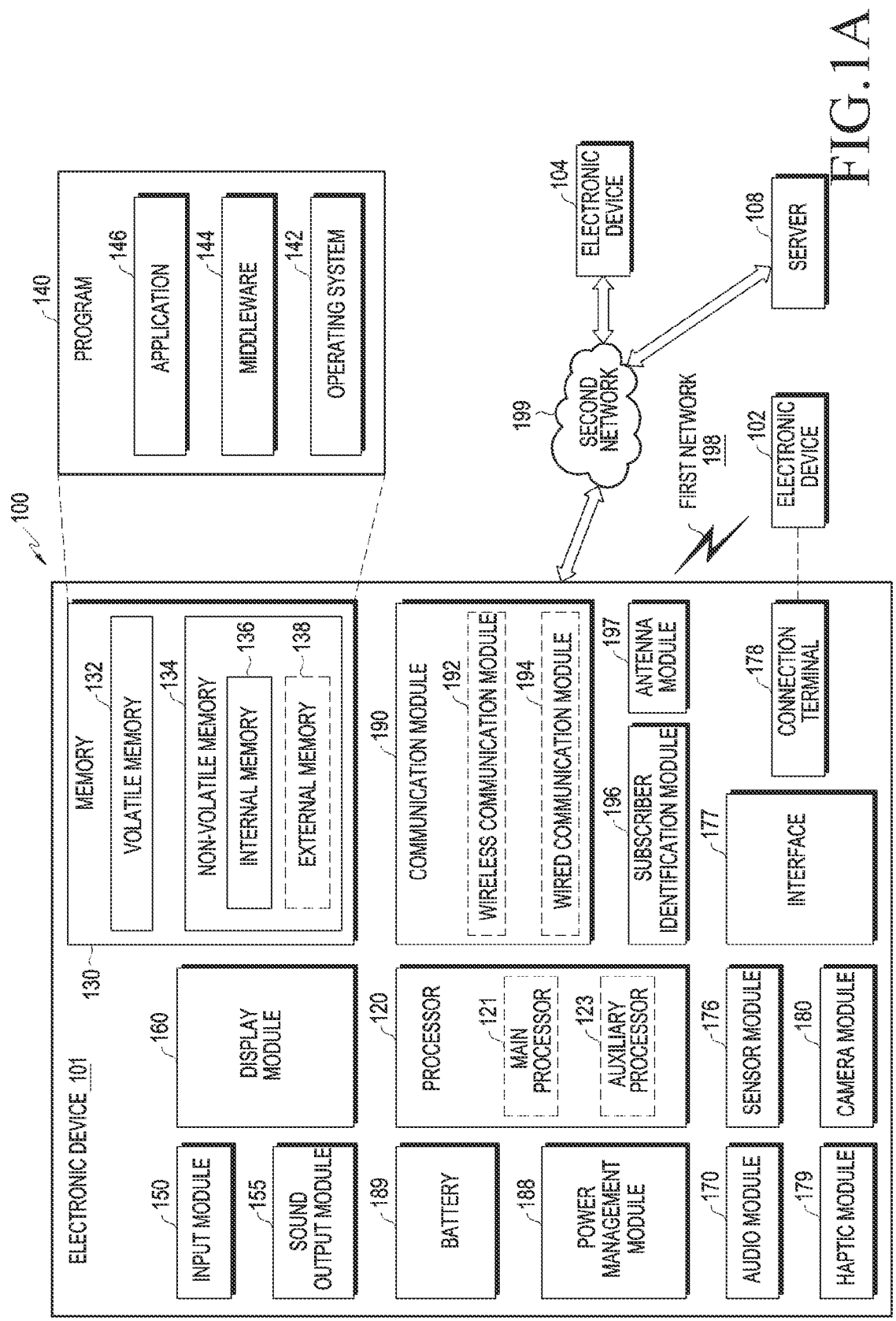
FIG. 1A is a block diagram illustrating an example of an electronic device in a network environment according to various embodiments.

FIG. 1A is a block diagram illustrating an example of an electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function.

The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
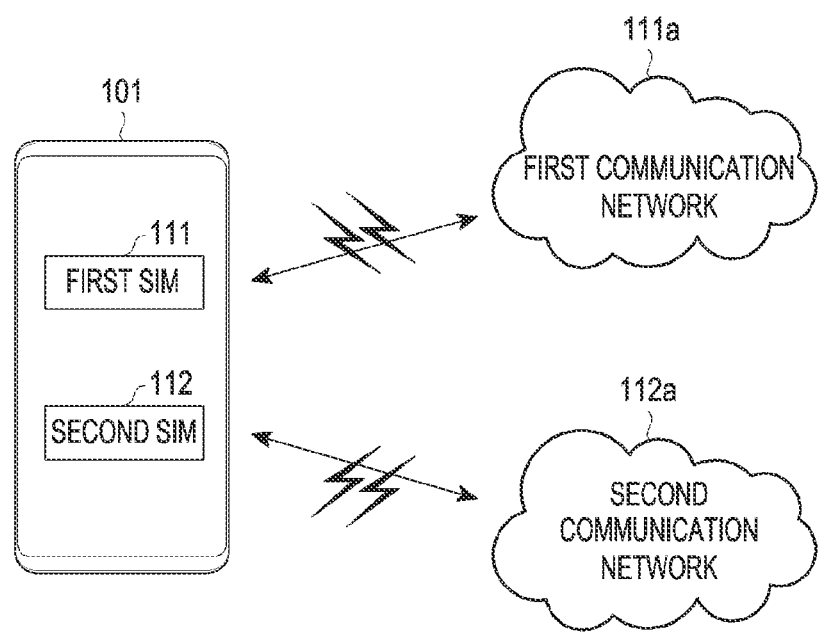
FIG. 1B is a diagram illustrating a network environment including an electronic device according to various embodiments.

FIG. 1B is a view illustrating an example network environment including an electronic device according to various embodiments. Referring to FIG. 1B, according to various embodiments of the disclosure, a network (e.g., the second network 199 of FIG. 1A) may include an electronic device 101, a first communication network 111a, and/or a second communication network 112a.

According to various embodiments, the electronic device 101 may operate in a dual SIM dual standby (DSDS) mode supporting two SIMs in one device. For example, the electronic device 101 may include (or connect to) two SIMs, e.g., a first SIM 111 and a second SIM 112. The types of the first SIM 111 and the second SIM 112 are not limited. For example, the first SIM 111 and the second SIM 112 may be removable SIMs (rSIMs) (e.g., SIM cards). For example, the electronic device 101 may include a first slot (not shown) and a second slot (not shown), which are first structures, to receive the first SIM 111 and the second SIM 112, respectively. In this case, it will be appreciated by one of ordinary skill in the art that when the electronic device 101 includes the first SIM 111 and the second SIM 112, this may refer, for example, to the first SIM 111 and the second SIM 112 being mounted in the electronic device 101 but may not refer to the first SIM 111 and the second SIM 112 necessarily being included in the electronic device 101. As another example, at least one of the first SIM 111 and the second SIM 112 may include an embedded subscriber identity module (eSIM). The eSIM may be referred to as an eUICC.

According to various embodiments, the first SIM 111 may include a SIM which has subscription to the mobile network operator of the first communication network 111a. The electronic device 101 may access the first communication network 111a using the first SIM 111 to receive the wireless communication service. The second SIM 112 may include an SIM having subscription to the mobile network operator of the second communication network 112a. The electronic device 101 may access the second communication network 112a using the second SIM 112 to receive the wireless communication service. As another example, although not shown, the first SIM 111 and the second SIM 112 may be SIMs having subscription to the mobile network operator of the same communication network. For example, the operators of the first communication network and the second communication network may be the same. For example, the first SIM 111 and the second SIM 112 may be SIMs corresponding to different subscriber information and having subscription to the same mobile network operator.

Figure 2A:
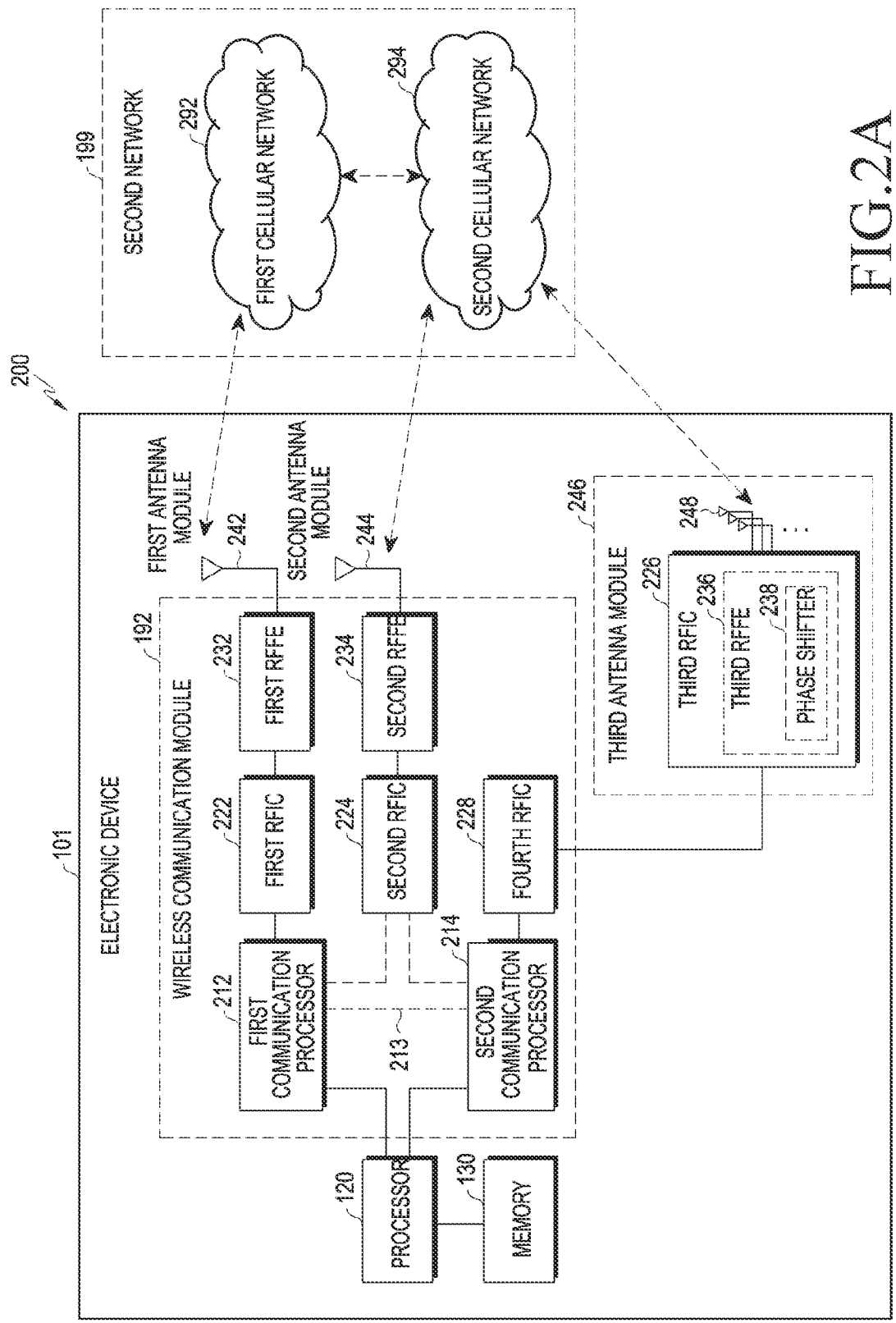
FIG. 2A is a block diagram illustrating an example of an electronic device for supporting legacy network communication and 5G network communication according to various embodiments.

FIG. 2A is a block diagram 200 illustrating an example of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
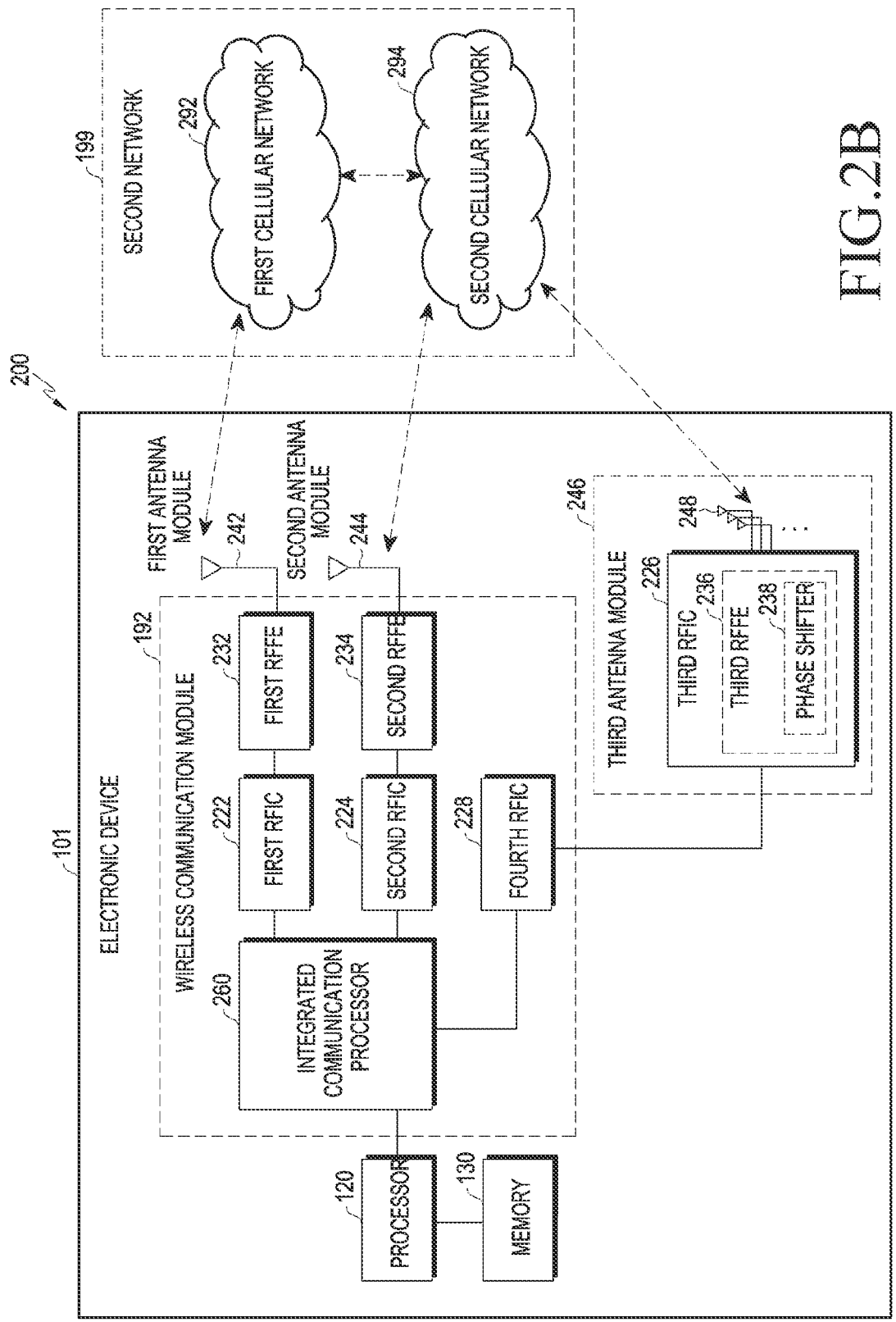
FIG. 2B is a block diagram illustrating an example of an electronic device for supporting legacy network communication and 5G network communication according to various embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE, (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
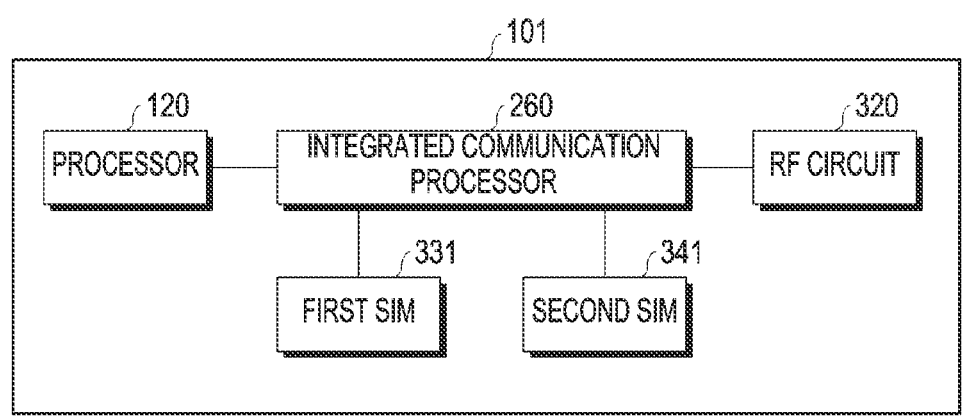
FIG. 3 is a block diagram illustrating an example of an electronic device according to various embodiments.

FIG. 3 is a block diagram illustrating an example of an electronic device according to various embodiments;

According to various embodiments, the electronic device 101 may include at least one of a processor (e.g., including processing circuitry) 120, an integrated communication processor (e.g., including processing circuitry) 260, an RF circuit 320, a first SIM 331, and/or a second SIM 341. At least one of the first SIM 331 or the second SIM 341 may be an rSIM. In this case, the electronic device 101 may further include at least one slot for connection with the rSIM. Further, as described above, the rSIM is detachable from the electronic device 101 and is not necessarily a component of the electronic device 101. At least one of the first SIM 331 or the second SIM 341 may be an eSIM.

According to various embodiments, the integrated communication processor 260 may support a designated number (e.g., two) of SIMs. It will be appreciated by one of ordinary skill in the art that in place of the integrated communication processor 260, a first communication processor (e.g., the first communication processor 212 of FIG. 2A) and a second communication processor (e.g., the second communication processor 214 of FIG. 2A) may be implemented in the electronic device 101. Although not shown, the electronic device 101 may include more than the designated number of SIMs (e.g., two rSIMs and one eSIM). In this case, the electronic device 101 may further include a switch (not shown) for switching SIM connections between the plurality of SIMs and the integrated communication processor 260.

According to various embodiments, the integrated communication processor 260 may establish a communication channel of a band that is to be used for wireless communication or may support network communication via the established communication channel. For example, the integrated communication processor 260 may support at least one of second generation (2G), 3G, 4G, or 5G network communication. The RF circuit 320 may include at least one of, e.g., a radio frequency integrated circuit (RFIC), a radio frequency front end (RFFE), or an antenna module. The RF circuit 320 may process data (e.g., a baseband signal) output from the integrated communication processor 260 into an RF signal and transmit it through an antenna module. Or, the RF circuit 320 may convert the RF signal, received through the antenna module, into a baseband signal and transfer the converted signal to the integrated communication processor 260. The RF circuit 320 may process RF signals or baseband signals according to the communication scheme supported by the integrated communication processor 260, and the type of the RF circuit 320 is not limited. Interfaces between the components may be implemented as, e.g., a general purpose input/output (GPIO), UART (e.g., HS-UART or PCIe interface), but are not limited to a specific type. Alternatively, at least some of the components may exchange control information or packet data information using, e.g., a shared memory. Meanwhile, in the embodiment of FIG. 3, the processor 120 and the integrated communication processor 260 are shown as different hardware, but this is merely exemplary. The processor 120 and the integrated communication processor 260 may be different hardware but, according to another embodiment, the processor 120 and the integrated communication processor 260 may be implemented in a single chip.

The integrated communication processor 260 may obtain stored information from the first SIM 331 and the second SIM 341. For example, the stored information may include at least one of the integrated circuit card identifier (ICCID), IMSI, home public land mobile network (HPLMN)-related information, or mobile subscriber international ISDN number (MSSIDN). The stored information may be referred to as an elementary file (EF). The integrated communication processor 260 may perform, through the RF circuit 320, an authentication procedure for network communication corresponding to the first SIM 331 and/or the second SIM 341, based on the obtained information stored in the first SIM 331 and/or the second SIM 341. If authentication is successful, the integrated communication processor 260 may perform network communication corresponding to the first SIM 331 and/or the second SIM 341 through the RF circuit 320.

According to various embodiments, the integrated communication processor 260 may perform dual SIM network communications according to the first SIM 331 or the second SIM 341. The RF circuit 320 may provide a plurality of RF paths. The electronic device 101 may operate in the DSDS mode. According to various embodiments, the integrated communication processor 260 may be connected with the first SIM 331 and the second SIM 341, and both the SIMs 331 and 341 may operate in the DSDS mode. For example, while the operation associated with the first SIM 331 is performed by the RF circuit 320, the operation associated with the second SIM 341 may be deferred. For example, while the operation associated with the second SIM 341 is performed using the RF circuit 320, the operation associated with the first SIM 331 may be deferred. According to various embodiments, the integrated communication processor 260 may include two interfaces (e.g., interfaces according to ISO7816) for processing the SIM. The first SIM 331 and the second SIM 332 may be connected to two interfaces. For example, a first slot 330 may be connected to one interface, and a second slot 340 may be connected to the other interface.

Figure 4A:
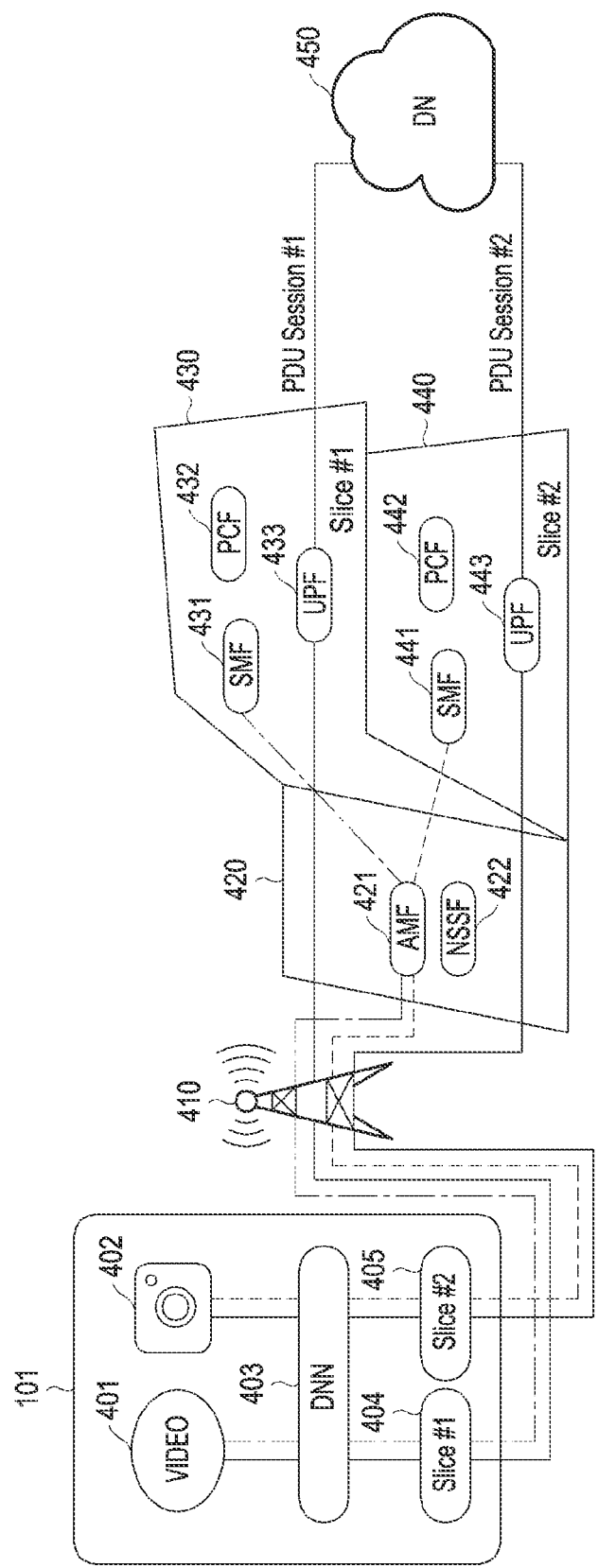
FIG. 4A is a diagram illustrating an example of establishing a data session for each application according to various embodiments.

FIG. 4A is a diagram illustrating an example of establishing a data session for each application according to various embodiments.

According to various embodiments, a plurality of applications 401 and 402 may be executed on the electronic device 101. For example, at least some of the plurality of applications 401 and 402 may be stored in the electronic device 101, or at least some may be accessed by the electronic device 101. The plurality of applications 401 and 402 may transmit/receive data to and from the data network 450. The electronic device 101 may store information 403 for selecting a DNN, and based thereupon, may select a DNN. The first application 401 may transmit/receive data to and from the data network 450 through the first network slice 430, and the second application 402 may transmit/receive data to and from the data network 450 through the second network slice 440. The first network slice 430 and the second network slice 440, respectively, may include session management function (SMF)s 431 and 441, policy control function (PCF)s 432 and 442, and user plane function (UPF)s 433 and 443.

According to various embodiments, the electronic device 101 may be connected to the cores 420, 430, and 440 through the (R)AN 410. Some of the core 420 may include an AMF 421 and an NSSF 422. The electronic device 101 may transmit/receive control data to/from the SMFs 431 and 441 through the AMF 421. The electronic device 101 may transmit/receive data associated with the first application 401 to and from the data network 450 through the UPF 433 of the first network slice 430 and may transmit/receive data associated with the second application 402 to and from the data network 450 through the UPF 443 of the second network slice 440. The electronic device 101 may store information 403 for selecting a DNN, which is a descriptor for selecting a path, information 404 for selecting the first network slice 430, and information 405 (e.g., a traffic descriptor and/or a path selection descriptor) for selecting the second network slice 440. The electronic device 101 may establish a first data session (e.g., PDU session #1) through the first network slice 430 and a second data session (e.g., PDU session #2) through the second network slice 440 based on the stored information for path selection The electronic device 101 may transmit/receive information associated with the first application 401 using the first data session (PDU session #1) and may transmit/receive information associated with the second application 402 using the second data session (PDU session #2).

For example, the first application 401 may be an application that requires large-amount data transmission/reception, and the first network slice 430 may support enhanced mobile broadband (eMBB) characteristics. For example, the second application 402 may be an application that requires low-latency data transmission and reception, and the second network slice 440 may support ultra-reliable low latency communications (URLLC) characteristics. Accordingly, the first application may transmit/receive large amounts of data to and from the data network 450 through the first network slice 430, and the second application may transmit/receive data through the second network slice 440 at a low latency rate.

According to various embodiments, the first data session (e.g., session #1) based on the first network slice 430 may be established corresponding to the first SIM 331, and the second data session (e.g., session #2) based on the second network slice 440 may be established corresponding to the second SIM 341. Although FIG. 4A illustrates that one first data session (e.g., session #1) is established corresponding to the first SIM 331, and one second data session (e.g., session #2) is established corresponding to the second SIM 341, this is an example, and it will be understood by those skilled in the art that a plurality of data sessions may be established for one SIM.

According to various embodiments, when both the SIMs 331 and 341 operate in the DSDS mode, processing of data packets through the first data session (e.g., session #1) may be deferred while data packets are processed through the first data session (e.g., session #1). Further, while data packets are processed through the second data session (e.g., session #2), processing of data packets through the first data session (e.g., session #1) may be deferred. If the data packet processing of the second application 402 for URLLC is delayed according to the operation of the first SIM 331, a problem due to service delay may occur. According to various embodiments, when data packet processing for URLLC is requested, the electronic device 101 may preferentially perform data packet processing for URLLC while deferring the operation by the first SIM 331 (e.g., data packet processing based on the first application 401 and/or signaling operation associated with the first SIM 331).

Figure 4B:
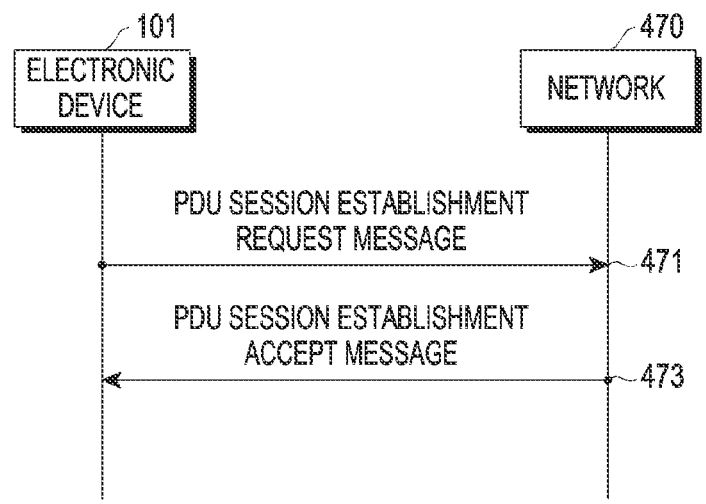
FIG. 4B is a flowchart illustrating an example method of operating an electronic device according to various embodiments.
Figure 4C:
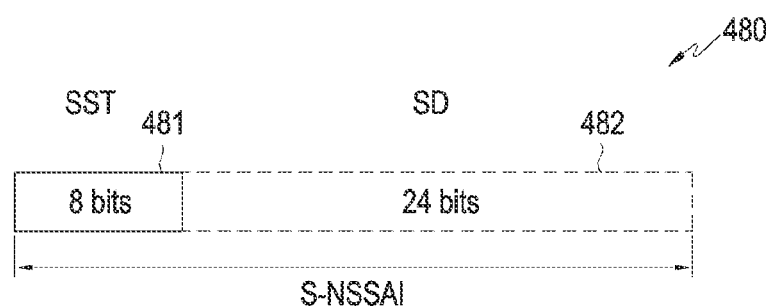
FIG. 4C illustrates a structure of single-network slice selection assistance information (S-NSSAI) according to various embodiments.

FIG. 4B is a flowchart illustrating an example method of operating an electronic device according to various embodiments. The embodiment of FIG. 4B is described with reference to FIG. 4C. FIG. 4C is a diagram illustrating an example structure of single-network slice selection assistance information (S-NSSAI) according to various embodiments.

According to various embodiments, an electronic device 101 (e.g., at least one of the processor 120, the first communication processor 212, the second communication processor 214, or the integrated communication processor 260) may transmit a PDU session establishment request message to the network 470 (e.g., the AMF and/or the SMF) in operation 471. The PDU session establishment request may be a message for initiating establishment of a PDU session.

According to various embodiments, the network 470 may determine whether to establish a PDU session for the electronic device 101. If the network 470 determines to establish a PDU session for the electronic device 101, the network 470 may transmit a PDU session establishment accept message to the electronic device 101 in operation 473. The PDU session establishment accept message may include at least one of a PDU session identifier (ID), a PDU address, or an S-NSSAI. The network 470 may set at least one of a PDU session ID, a PDU address, and an S-NSSAI for the electronic device 101. The PDU session ID may include information for identifying the PDU session. For example, a PDU session identifier information element (IE) may be included in bits 1 to 8 of the second octet of the 5GSM message. The PDU session ID may be used, e.g., to identify a radio bearer where the actual data packet is to be transmitted. The PDU address may be an IP address assigned to the electronic device 101 by the network 470. For example, the PDU address may be any one of an IPv4 address (e.g., IPv4) associated with the PDU session, an interface identifier (e.g., IPv6) for an IPv6 link-local address associated with the PDU session, an identifier of an interface for the IPv6 link-local address associated with the PDU session, and an IPv4 address (e.g., IPv4v6), but is not limited thereto. The PDU address may include a PDU session type (e.g., a value indicating any one of IPv4, IPv6, IPv4v6, unstructured, or Ethernet) and address information.

The S-NSSAI may be information for identifying a network slice. As shown in FIG. 4C, according to various embodiments, the S-NSSAI 480 may include a slice/service type (SST) 481 and a slice differentiator (SD) 482. The SST 481 may denote an expected network slice operation in terms of features and services. The SD 482 may be an element for differentiating each of a plurality of network slices of the same SST. Table 1 shows features according to SST values.

TABLE 1

| SST | SST value | feature |
| --- | --- | --- |
| eMBB | 1 | slice appropriate for handling of enhanced mobile broadband (eMBB) |
| URLLC | 2 | slice appropriate for handling of URLLC |
| MIoT | 3 | slice appropriate for handling of massive IoT |

The electronic device 101 may identify the features of the PDU session based on the SST value included in the PDU session establishment accept message. For example, if the SST value included in the PDU session establishment accept message is "2", the electronic device 101 may identify that the corresponding PDU session is for URLLC.

Figure 5:
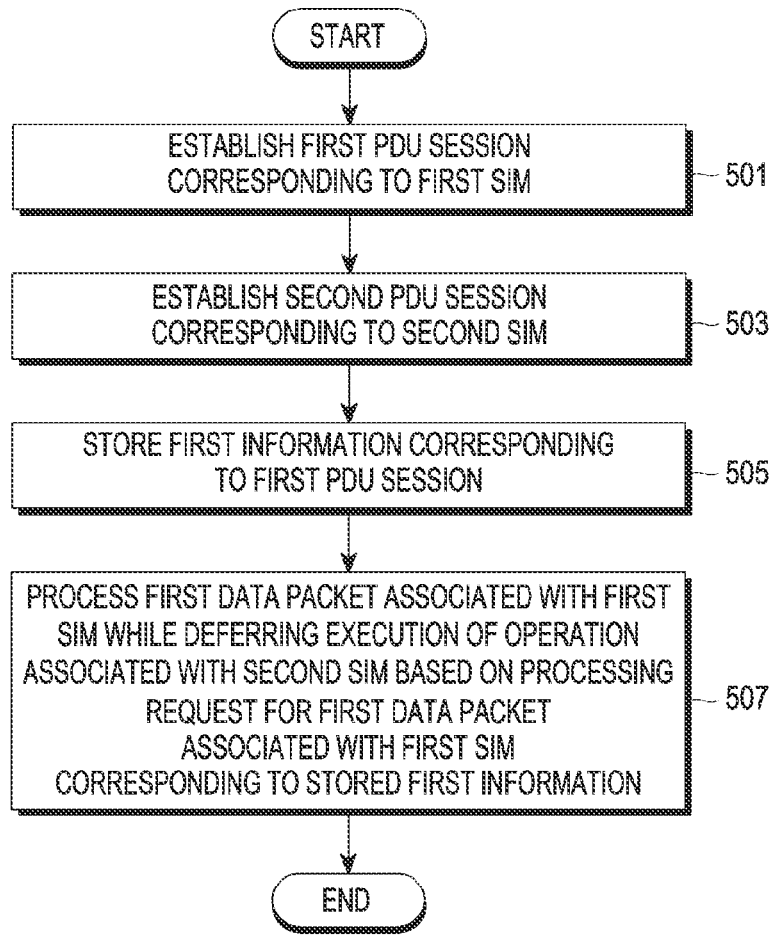
FIG. 5 is a view illustrating an example method of establishing a data session for each application according to various embodiments.

FIG. 5 is a view illustrating example establishment of a data session for each application, according to various embodiments.

According to various embodiments, an electronic device 101 (e.g., at least one of the processor 120, the first communication processor 212, the second communication processor 214, or the integrated communication processor 260) may establish a first PDU session corresponding to the first SIM 331 in operation 501. In operation 503, the electronic device 101 may establish a second PDU session corresponding to the second SIM. As described above, the electronic device 101 may establish a PDU session based on the transmission of a PDU session establishment request message and the reception of a PDU session establishment accept message. For example, the electronic device 101 may perform a PDU session establishment procedure based on a request from the application, but the trigger is not limited to a specific one. The electronic device 101 may establish a first PDU session based on a request from an application associated with the first SIM 331 (or another type of trigger associated with the first SIM 331). The electronic device 101 may establish a second PDU session based on a request from an application associated with the second SIM 341 (or another type of trigger associated with the second SIM 341). The electronic device 101 may identify the network slice type corresponding to the first PDU session based on the S-NSSAI included in the first PDU session establishment accept message corresponding to the first PDU session. The electronic device 101 may identify the network slice type corresponding to the second PDU session based on the S-NSSAI included in the second PDU session establishment accept message corresponding to the second PDU session.

According to various embodiments, in operation 505, the electronic device 101 may store first information for the first PDU session based on the network slice type of the first PDU session being a predesignated first type. According to an embodiment, the electronic device 101 may set URLLC as the predesignated first type. For example, if the network slice type corresponding to the first PDU session is URLLC and the network slice type corresponding to the second PDU session is eMBB, the electronic device 101 may identify that the network slice type of the first PDU session is the predesignated first type. As described above, the electronic device 101 may determine whether type of a specific network slice is a designated type based on the SST value in the PDU session establishment accept message. For example, the electronic device 101 may set the SST value of "2" as a predesignated value and may identify whether the SST value in the PDU session accept message is "2". If the network slice type of a specific PDU session is identified as the designated first type, the electronic device 101 may store information (e.g., the PDU address and/or a PDU session ID) for the PDU session as information for preferential packet data processing.

According to various embodiments, in operation 507, the electronic device 101 may process the first data packet associated with the first SIM 331 while deferring the operation associated with the second SIM 341 based on a request for processing the first data packet associated with the first SIM 331 corresponding to the stored first information. In an example, the electronic device 101 may identify a transmission request of the first data packet associated with the first PDU session of the first SIM 331. For example, the electronic device 101 may identify the first data packet transmission request from the application associated with the first PDU session. The electronic device 101 may identify that the processing request corresponds to the stored first information. For example, the electronic device 101 may identify that the IP address associated with the first data packet corresponds to the PDU address stored as the first information. For example, the electronic device 101 may identify that the PDU session identifier corresponding to the first data packet corresponds to the PDU session identifier stored as the first information. If it is identified that the processing request corresponds to the first information, the electronic device 101 may preferentially process the data packet associated with the PDU session and may defer (or disregard) at least one operation by the other SIM. For example, if a request for processing the data packet associated with the second SIM 341 is identified, the electronic device 101 may preferentially process the first data packet and may defer (or disregard) the processing of the data packet associated with the second SIM 341. For example, the electronic device 101 may defer (or disregard) the signaling operation associated with the second SIM 341 (e.g., PDCCH monitoring for paging or not). Accordingly, processing of data packets for URLLC may be preferentially performed and may not be interrupted by an operation based on the other SIM (e.g., the second SIM 341) based on DSDS. Meanwhile, it is merely exemplary that the designated network slice type is URLLC, and the type of network slice type is not limited to a specific one. A plurality of network slice types may be designated.

Figure 6:
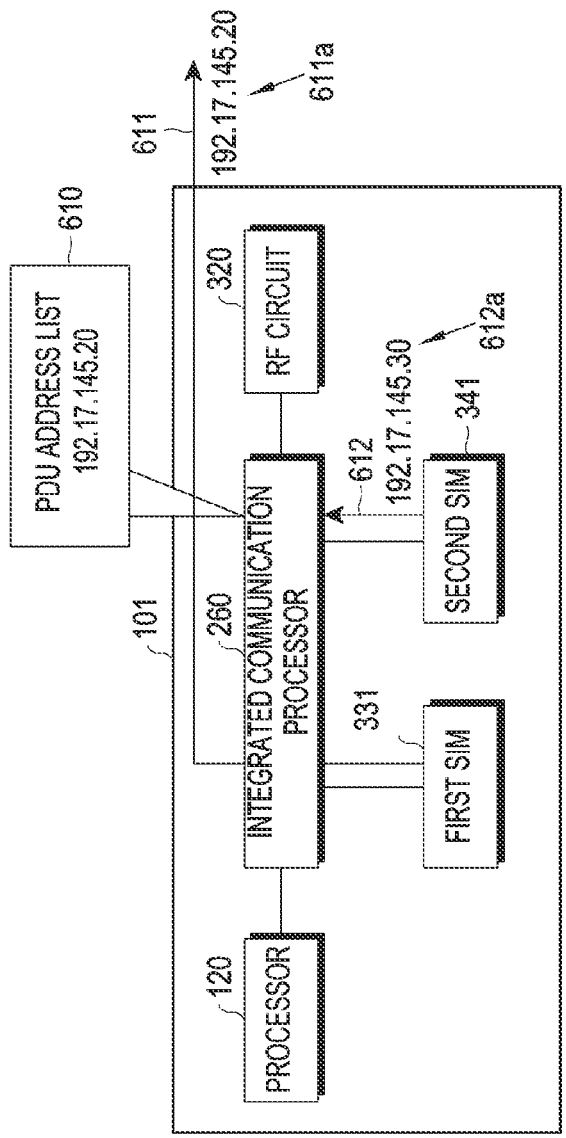
FIG. 6 is a view illustrating example preferential processing of a data packet according to various embodiments.

FIG. 6 is a view illustrating example preferential processing of a data packet according to various embodiments.

According to various embodiments, an electronic device 101 (e.g., at least one of the processor 120, the first communication processor 212, the second communication processor 214, or the integrated communication processor 260) may establish a first PDU session corresponding to the first SIM 331 and a second PDU session corresponding to the second SIM 341. The electronic device 101 may identify information in the first PDU session establishment accept message corresponding to the first PDU session and information in the second PDU session establishment accept message corresponding to the second PDU session. For example, the electronic device 101 may identify that the network slice type of the first PDU session is a designated type (e.g., URLLC) based on the identified information. The electronic device 101 may store the information 610 associated with the first PDU session as information for reference for determining whether to preferentially perform processing according to the result of identification.

According to various embodiments, the information 610 associated with the first PDU session may include the PDU address of the first PDU session, but is not limited to a specific type. The PDU address of the first PDU session may be, e.g., 192.17.145.20, and the electronic device 101 may store the PDU address. The PDU address may be, e.g., an IP address allocated to the electronic device by a packet data network (PDN). Although FIG. 6 illustrates as if the integrated communication processor 260 refers to the first information 610, this is merely exemplary and the processor 120 may also refer to the first information 610, which is described below.

According to various embodiments, the electronic device 101 may identify a processing request 611 for the first data packet associated with the first SIM 331. Although FIG. 6 illustrates as if the first SIM 331 directly provides the processing request 611 for the first data packet to the integrated communication processor 260, this is for convenience of description. For example, the integrated communication processor 260 may receive the processing request 611 for the first data packet from the first protocol stack corresponding to the first SIM 331. The processing request 611 for the first data packet may be associated with the first IP address 611a (e.g., 192.17.145.20). The electronic device 101 may identify the processing request 612 for the second data packet associated with the second SIM 341. Although FIG. 6 illustrates as if the second SIM 341 directly provides the processing request 612 for the second data packet to the integrated communication processor 260, this is for convenience of description. For example, the integrated communication processor 260 may receive the processing request 612 for the second data packet from the second protocol stack corresponding to the second SIM 341. The processing request 612 for the second data packet may be associated with the second IP address 612a (e.g., 192.17.145.30).

According to various embodiments, the electronic device 101 may identify that the IP address 611a of the processing request 611 for the first data packet corresponds to pre-stored first information 610 and that the IP address 612a of the processing request 612 for the second data packet does not correspond to the pre-stored first information 610. The electronic device 101 may process the first data packet using the RF circuit 320. Accordingly, the first data packet associated with the first SIM 331 may be transmitted using the RF circuit 320. Meanwhile, the electronic device 101 may defer (or disregard) the processing request 612 for the second data packet. The RF circuit 320 may be used by the first SIM 331 for processing the first data packet and, during the course, the operation associated with the second SIM 341 may be deferred or disregarded. The electronic device 101 may defer (or disregard) the signaling operation (e.g., monitoring whether paging) associated with the second SIM 341 as well as the processing request 612 for the data packet associated with the second SIM 341. Accordingly, the RF circuit 320 may be monopolized by the first SIM 331. For example, the electronic device 101 may defer (or disregard) the operation associated with the second SIM 341 until it is identified that the processing of the first data packet associated with the first SIM 331 is completed. Alternatively, the electronic device 101 may defer (or disregard) the operation associated with the second SIM 341 for a predesignated time period. As described above, the electronic device 101 may preferentially process the data packet based on a designated network slice type, and an interrupt by the other SIM may not occur.

According to various embodiments, the electronic device 101 may be configured to defer (or disregard) all operations associated with the second SIM 341 while the data packet associated with the first PDU session of the first SIM 331 is being processed. According to another embodiment, while the data packet associated with the first PDU session of the first SIM 331 is being processed, the electronic device 101 may be configured to defer (or disregard) some of all of the operations associated with the second SIM 341 but perform other operations. For example, the electronic device 101 may defer the data packet processing for the second SIM 341 but may perform the monitoring operation of whether to perform paging based on the second SIM 341 regardless of whether to process the data packet associated with the first PDU session of the first SIM 331. For example, some of the operations associated with the second SIM 341 may be set as interruptible operations. If the accurate reception of the paging of the second SIM 341 is more important than the low delay of the URLLC service, the electronic device 101 may perform the monitoring operation of whether to perform paging on the second SIM 341 even while the data packet associated with the first PDU session is being processed. There is no limitation on the operation of the interruptible second SIM 341.

Figure 7:
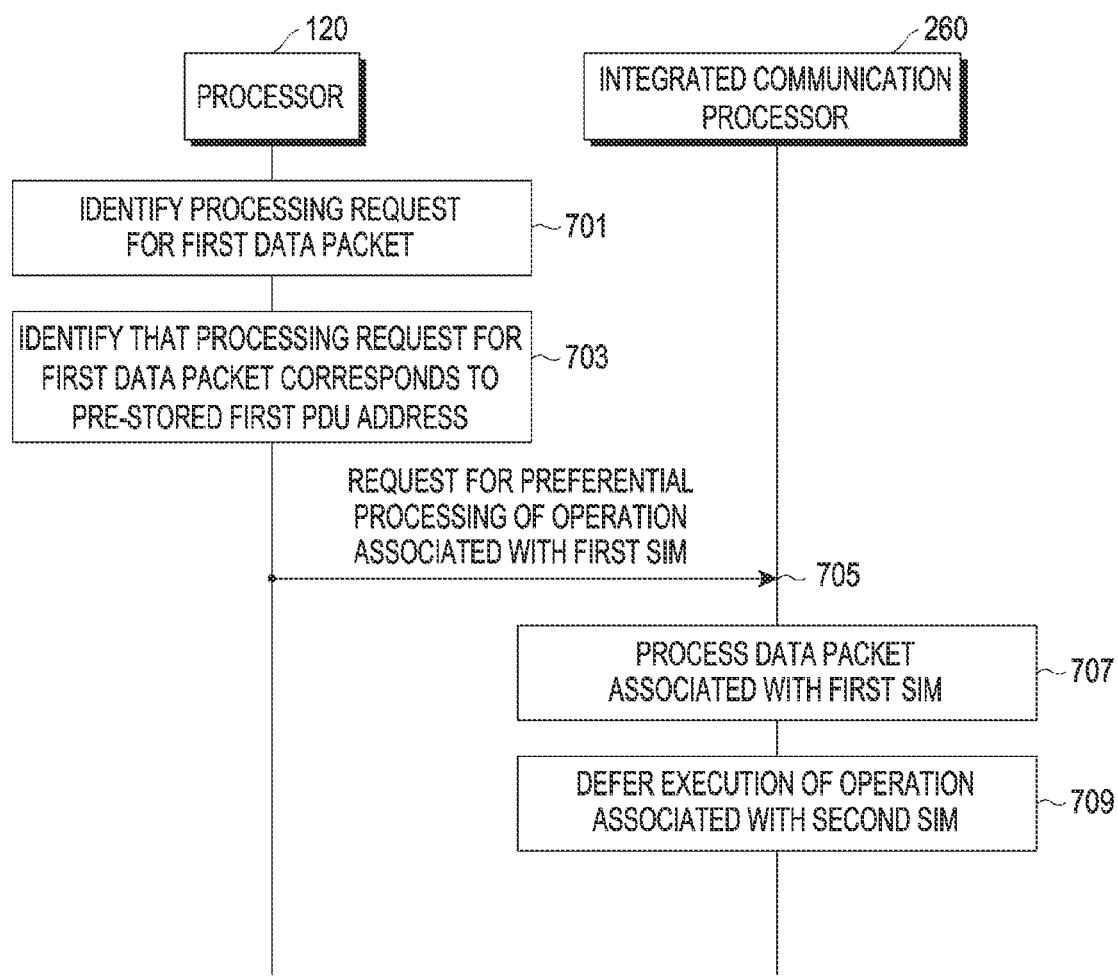
FIG. 7 is a flowchart illustrating example operations of an application processor and an integrated communication processor according to various embodiments.
Figure 8:
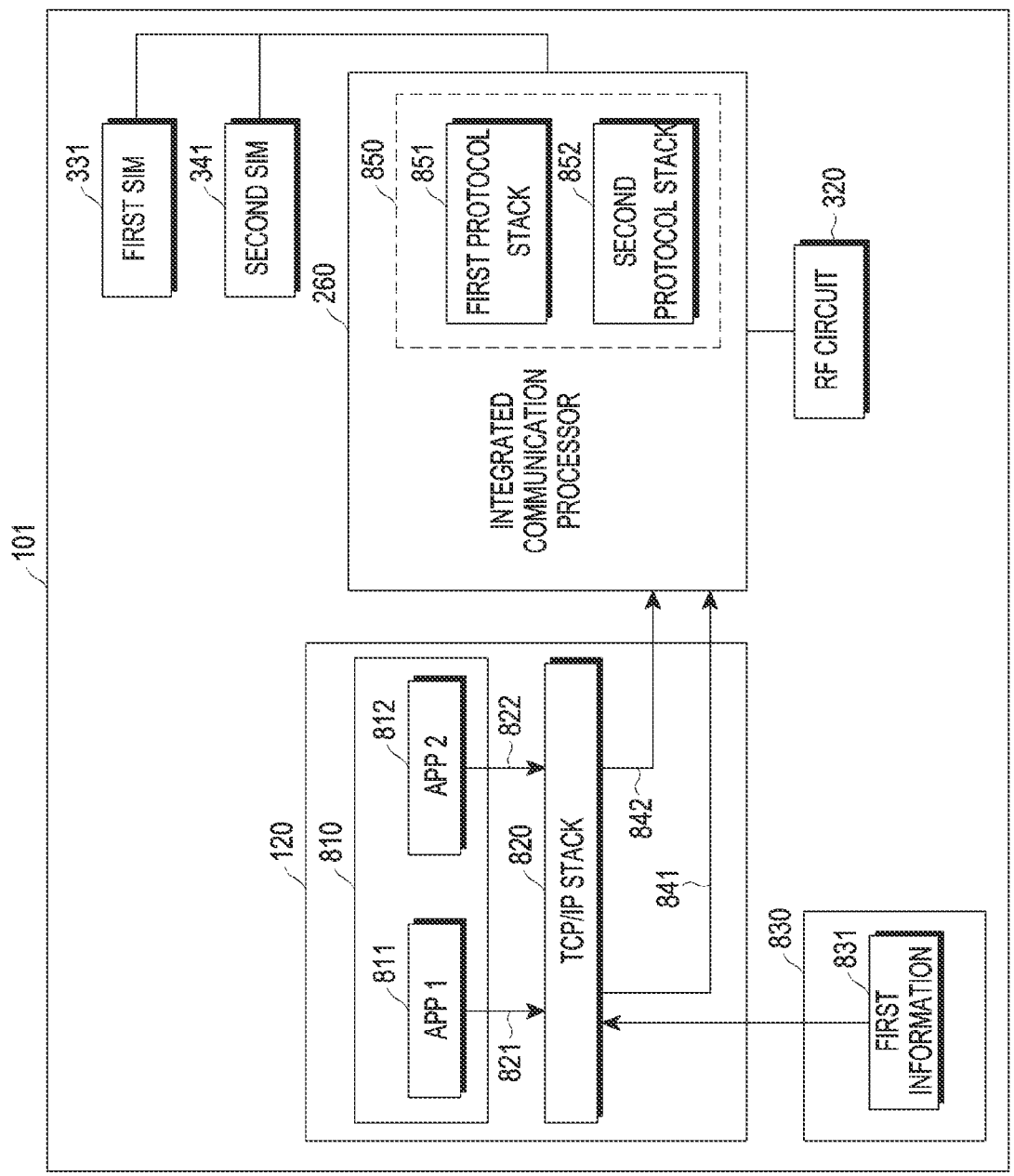
FIG. 8 is a block diagram illustrating an example of an electronic device according to various embodiments.

FIG. 7 is a flowchart illustrating example operations of an application processor and an integrated communication processor according to various embodiments. The embodiment of FIG. 7 is described with reference to FIG. 8. FIG. 8 is a block diagram illustrating an example of an electronic device according to various embodiments.

According to various embodiments, the processor 120 may identify the processing request for the first data packet in operation 701. For example, referring to FIG. 8, an application layer 810 and a TCP/IP stack 820 may be defined in the processor 120. At least one application (e.g., the first application 811 and the second application 812) may be executed on the application layer 810. The TCP/IP stack 820 may include an Internet protocol (IP) of a packet communication scheme and a transport control protocol (TCP), which is a transmission adjustment protocol. According to various embodiments, it will be appreciated by one of ordinary skill in the art that TCP may be replaced by user data protocol (UDP). The TCP/IP stack 820 may receive data packets from the applications 811 and 812. The TCP/IP stack 820 may control the transmission order of data packets and retransmit data packets. The TCP/IP stack 820 may include an IP address in the received data packet and provide it. The IP address-added data packet provided from the TCP/IP stack 820 may be called an IP packet. The TCP/IP stack 820 may receive a first data packet from the first application 811 through, e.g., a first port 821 (or a socket) and may receive a second data packet from the second application 812 through a second port 822.

According to various embodiments, the electronic device 101 may form a socket in the application layer 810 to perform communication with another entity (e.g., a server). The electronic device 101 may form a socket associated with at least one of a protocol of TCP or UDP, a local IP address, a local port number, a remote IP address, or a remote port number, so that a port corresponding to the formed socket may be defined between the applications 811 and 812 and the TCP/IP stack 820. For example, a first socket corresponding to the first application 811 and a second socket corresponding to the second application 812 may be formed based on information shown in Table 2.

TABLE 2

| Socket | protocol | local IP address | local port number | remote IP address | remote port number |
|---|---|---|---|---|---|
| first socket | TCP | 192.17.145.20 | 20124 | 10.12.75.216 | 8087 |
| second socket | TCP | 192.17.145.30 | 20125 | 10.41.128.98 | 10019 |

The electronic device 101 may form a socket based on an API (e.g., Socket( ), and/or Connected( )) according to the OS, and there is no limitation on the API. The electronic device 101 may establish a connection with another entity (e.g., a server) using, e.g., a synchronization packet (e.g., SYN packet) and/or an ACK (e.g., an SYN ACK, and/or an ACK). The TCP/IP stack 820 may identify and manage association information between the formed socket and the PDU session. In the embodiment of FIG. 8, it is illustrated as if the applications 811 and 812 are connected to one port, but this is exemplary. A plurality of sockets may be formed for one application in which case one application may transmit/receive data to and from the TCP/IP stack 820 through a plurality of ports. According to various embodiments, it is assumed that a first PDU session corresponding to the first SIM 331 and a second corresponding to the second SIM 341 have already been established. As described with reference to FIG. 5, based on the network slice type of the first PDU session being a designated type (e.g., URLLC), the first information 831 for the first PDU session may be stored in the memory 130. The first information 831 may be, e.g., a PDU address of the first PDU session. Meanwhile, the first port 821 may be set to correspond to the first PDU address of the first PDU session set corresponding to the first application, and the second port 822 may be set to correspond to the second PDU address of the second PDU session set corresponding to the second application 812.

According to various embodiments, in operation 703, the processor 120 may identify that the processing request for the first data packet corresponds to the previously stored first PDU address. The TCP/IC stack 820 may identify that the IP address associated with the first data packet is the first PDU address based on the reception of the first data packet through the first port 821. The TCP/IC stack 820 may identify that the IP address associated with the second data packet is the second PDU address based on the reception of the second data packet through the second port 822. The processor 120 may identify that the IP address associated with the first data packet corresponds to the stored first information 831, e.g., the first PDU address.

According to various embodiments, in operation 705, the processor 120 may request the integrated communication processor 260 to preferentially process the operation associated with the first SIM 331. In operation 707, the integrated communication processor 260 may process the data packet associated with the first SIM by the RF circuit 320. Processing of a data packet using the RF circuit 320 may include transmission and/or reception of the data packet. Transmission of the data packet may refer, for example, to obtaining the data packet through the port, processing the baseband signal corresponding to the data packet to generate an RF signal (e.g., including generation of an intermediate frequency signal), and/or radiating the RF signal through at least one antenna. Operations for transmitting the data packet may include, e.g., an operation for controlling at least some of a plurality of pieces of hardware constituting the RF circuit 320 to generate and radiate an RF signal. Reception of the data packet may refer, for example, to obtaining and/or processing an RF signal through at least one antenna, obtaining a base band signal from the RF signal (e.g., including generation of an intermediate frequency signal), and/or providing the data packet corresponding to the base band signal to the corresponding port. Operations for receiving the data packet may include, e.g., an operation for controlling at least some of a plurality of pieces of hardware constituting the RF circuit 320 to obtain the RF signal and obtain the baseband signal.

According to various embodiments, in operation 709, the integrated communication processor 260 may defer execution of the operation associated with the second SIM 341. For example, the TCP/IC stack 820 may provide the first data packet associated with the first SIM 331 to the integrated communication processor 260 through the first network interface 841. For example, the TCP/IC stack 820 may provide the second data packet associated with the second SIM 341 to the integrated communication processor 260 through the second network interface 842. In the integrated communication processor 260, e.g., a 3GPP protocol stack 850 may be defined. The 3GPP protocol stack 850 may be, e.g., a set of instructions for performing at least one operation for outputting the received data packet as a physical signal through the RF circuit 320 and may follow the 3GPP standards. For example, the 3GPP protocol stack 850 may be composed of a first protocol stack 851 corresponding to the first SIM 331 and a second protocol stack 852 corresponding to the second SIM 341. The first protocol stack 851 may be a set of instructions for performing the operation associated with the first SIM 331, and the second protocol stack 852 may be a set of instructions for performing the operation associated with the second SIM 341.

According to various embodiments, the integrated communication processor 260 may process the first data packet received through the first network interface 841 using the RF circuit 320. The integrated communication processor 260 may defer (or disregard) the execution of the operation associated with the second SIM 341 based on a request for preferential processing of the operation associated with the first SIM 331. For example, the integrated communication processor 260 may defer (or disregard) the processing of the second data packet even when the second data packet is received through the second network interface 842. For example, the integrated communication processor 260 may previously identify that the second network interface 842 is associated with the second SIM 341 and store it and may then defer the processing of the second data packet through the second network interface 842. Alternatively, the integrated communication processor 260 may defer (or disregard) the signaling operation associated with the second SIM 341. Although it is requested by the second protocol stack 852 to use the RF circuit 320, the integrated communication processor 260 may defer or disregard it.

According to various embodiments, the RF circuit 320 may obtain an RF signal from the outside through at least one antenna included therein. The RF circuit 320 may provide the baseband signal obtained from the RF signal to the integrated communication processor 260. The integrated communication processor 260 may process the baseband signal and provide the data packet to the TCP/IP stack 820. The TCP/IP stack 820 may provide the provided data packet to the corresponding port. The TCP/IP stack 820 may determine whether the IP address of the data packet corresponds to the previously stored first information 831. If the IP address of the data packet corresponds to the previously stored first information 831, the TCP/IP stack 820 may request the integrated communication processor 260 to preferentially use the RF circuit 320 of the first SIM 331. The integrated communication processor 260 may process the data packet associated with the first SIM 331 using the RF circuit 320. The integrated communication processor 260 may defer (or disregard) the processing of the second data packet even when the second data packet is received through the second network interface 842. Alternatively, the integrated communication processor 260 may defer (or disregard) the signaling operation associated with the second SIM 341.

Figure 9A:
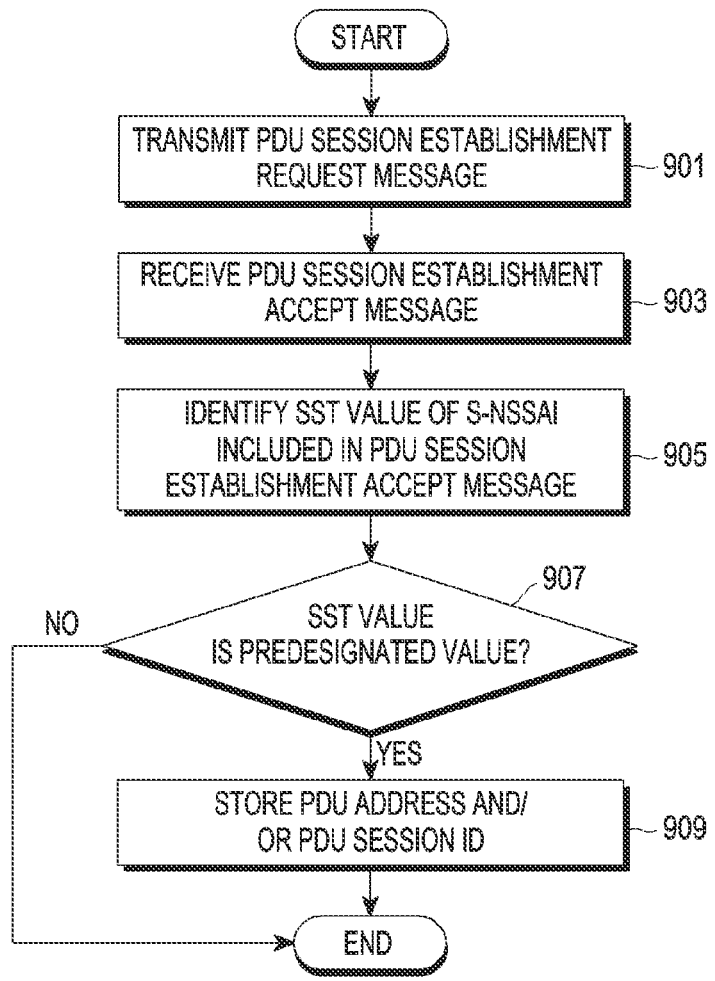
FIG. 9A is a view illustrating example preferential processing of a data packet according to various embodiments.

FIG. 9A is a flowchart illustrating an example of preferential processing of a data packet according to various embodiments.

According to various embodiments, an electronic device 101 (e.g., at least one of the processor 120, the first communication processor 212, the second communication processor 214, or the integrated communication processor 260) may transmit a PDU session establishment request message in operation 901. The electronic device 101 may receive a PDU session establishment accept message in operation 903. In operation 905, the electronic device 101 may identify the SST value (e.g., 481 of FIG. 4C) of the S-NSSAI included in the PDU session establishment accept message.

According to various embodiments, the electronic device 101 may determine whether the SST value is a predesignated value in operation 907. For example, if URLLC is set as a network slice type for preferential processing, the predesignated value may be "2". As described above, the predesignated value may be designated as a value other than "2", and it may be designated as a plurality of values. If it is determined that the SST value is a predesignated value (Yes in 907), the electronic device 101 may store a PDU address and/or a PDU session identifier in operation 909. Table 3 is an example of information regarding the PDU session established by the electronic device 101.

TABLE 3

| PDU session identifier | SST value | PDU address |
|---|---|---|
| 1 | 1 | 192.23.167.5 |
| 2 | 1 | 192.22.166.3 |
| 3 | 2 | 192.20.161.10 |
| 4 | 2 | 192.17.145.20 |
| 5 | 1 | 192.15.195.182 |

For example, the electronic device 101 may establish 5 PDU sessions and may identify and store the information in Table 2 based on the information in each PDU session establishment accept message. The electronic device 101 may store information for the PDU session in which the SST value has a designated value (e.g., 2) as information for reference. Table 4 is an example of reference information for preferential processing related to URLLC stored by the electronic device 101.

TABLE 4

| PDU address | PDU session identifier |
|---|---|
| 192.20.161.10 | 3 |
| 192.17.145.20 | 4 |

Although it is described in connection with Table 4 as if both the PDU address and the PDU session identifier are stored, only one of both the types of information may be stored, or the other information may be stored as information for reference. For example, if the TCP/IP stack (e.g., 820 of FIG. 8) determines whether to preferentially process, only the PDU address may be stored as information for reference. For example, if the 3GPP protocol stack of the communication processor determines whether to process preferentially, only the PDU session identifier may be stored as information for reference. For example, besides the PDU address and the PDU session identifier, the electronic device 101 may use the RB ID corresponding to the PDU session identifier or the network interface corresponding to the PDU session identifier as information for reference. The RB ID is described with reference to FIG. 9B. For example, the TCP/IP stack (e.g., 820 of FIG. 8) may process data packets for transmission or data packets for reception. The TCP/IP stack may determine whether the source IP address of the data packet for transmission corresponds (e.g., matches) the PDU address of the stored reference information. The TCP/IP stack may determine whether the destination IP address of the data packet for reception corresponds (e.g., matches) to the PDU address of the stored reference information. For example, if information for reference as shown in Table 3 is stored, the TCP/IP stack may identify that the source IP address of the data packet for transmission is 192.17.145.20. The TCP/IP stack may determine that "192.17.145.20" among the information for reference in Table 3 is the same as 192.17.145.20, which is the source IP address and may request a lower layer (e.g., 3GPP protocol stack) (or integrated communication processor 260) to preferentially process the data packet associated with the first SIM 331. The lower layer (e.g., 3GPP protocol stack) (or integrated communication processor 260) may perform processing of data packets associated with the first SIM 331 while deferring (or disregarding) the execution of the operation associated with the other SIM (e.g., the second SIM 341). For example, the TCP/IP stack may identify that the source IP address of the data packet for transmission is 192.22.166.3. The TCP/IP stack may determine that there is no PDU address identical to 192.22.166.3, which is the source IP address, among the information for reference in Table 3. The TCP/IP stack does not provide any special request to the lower layer. The lower layer (e.g., 3GPP protocol stack) (or integrated communication processor 260) performs the operation associated with the first SIM 331 and the operation associated with the second SIM 341 in a scheme according to the DSDS mode, using the RF circuit 320.

For example, if information for reference as shown in Table 3 is stored, the TCP/IP stack may identify that the destination IP address of the data packet for reception is 192.17.145.20. The TCP/IP stack may determine that "192.17.145.20" among the information for reference in Table 3 is the same as 192.17.145.20, which is the destination IP address and may request a lower layer (e.g., 3GPP protocol stack) (or integrated communication processor 260) to preferentially process the data packet associated with the first SIM 331. The lower layer (e.g., 3GPP protocol stack) (or integrated communication processor 260) may perform processing of data packets associated with the first SIM 331 while deferring (or disregarding) the execution of the operation associated with the other SIM (e.g., the second SIM 341). For example, the TCP/IP stack may identify that the destination IP address of the data packet for reception is 192.22.166.3. The TCP/IP stack may determine that there is no PDU address identical to 192.22.166.3, which is the destination IP address, among the information for reference in Table 3. The TCP/IP stack does not provide any special request to the lower layer. The lower layer (e.g., 3GPP protocol stack) (or integrated communication processor 260) performs the operation associated with the first SIM 331 and the operation associated with the second SIM 341 in a scheme according to the DSDS mode, using the RF circuit 320.

Figure 9B:
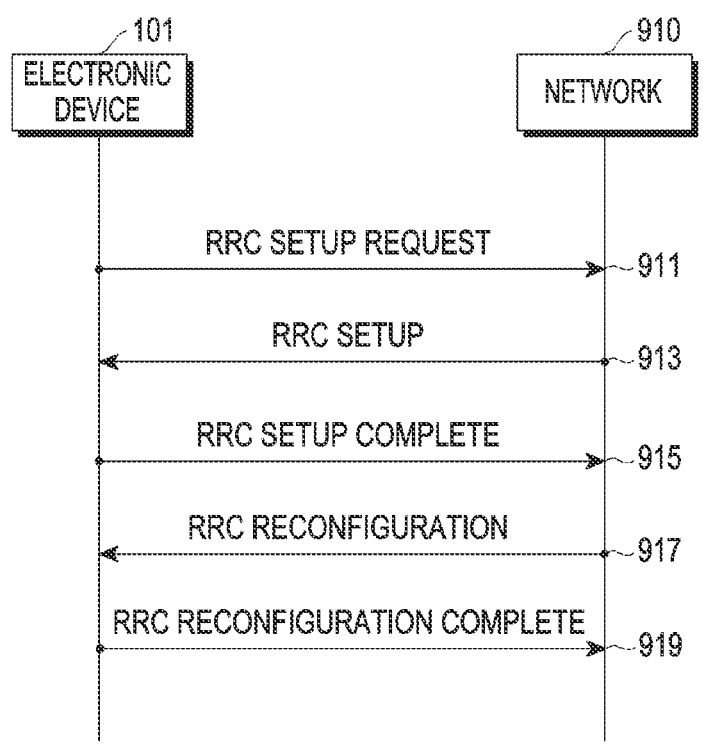
FIG. 9B is a flowchart illustrating example operations of an electronic device and a network according to various embodiments.

FIG. 9B is a flowchart illustrating an example method for operating an electronic device and a network according to various embodiments.

According to various embodiments, the electronic device 101 may establish an RRC connection with the network 910. The electronic device 101 may transmit an RRC Setup Request message to the network 910 in operation 911. The network 910 may transmit an RRC Setup message in response to the RRC Setup Request message in operation 913. The electronic device 101 may transmit an RRC Setup Complete message to the network 910 in operation 915.

According to various embodiments, the electronic device 101 may receive an RRC Reconfiguration message from the network 910 in operation 917. The RRC Reconfiguration message may include RB ID information. For example, the network 910 may provide (D)RB information capable of processing data transmission/reception in a wireless environment to the electronic device 101 through the Reconfiguration message. The electronic device 101 may recognize (D)RB information allocated to the electronic device 101 based on, e.g., the DRB-ToAddMod parameter. The electronic device 101 may identify which PDU a specific RB ID is linked to through PDU session ID information transferred together with the (D)RB ID. The electronic device 101 may store and manage, e.g., association information between the RB ID and the PDU session. Accordingly, the electronic device 101 may store and manage association information between the RB ID and the slice type. Since the RB ID and the PDU session are associated, the electronic device 101 may identify which RB ID is used when URLLC is used. For example, in a case where the first RB ID associated with the first SIM 331 is used, if the first RB ID corresponds to URLLC, the electronic device 101 may defer (or disregard) the operation associated with the second SIM 341. The electronic device 101 may transmit an RRC Reconfiguration Complete message to the network 910 in operation 919.

Figure 10:
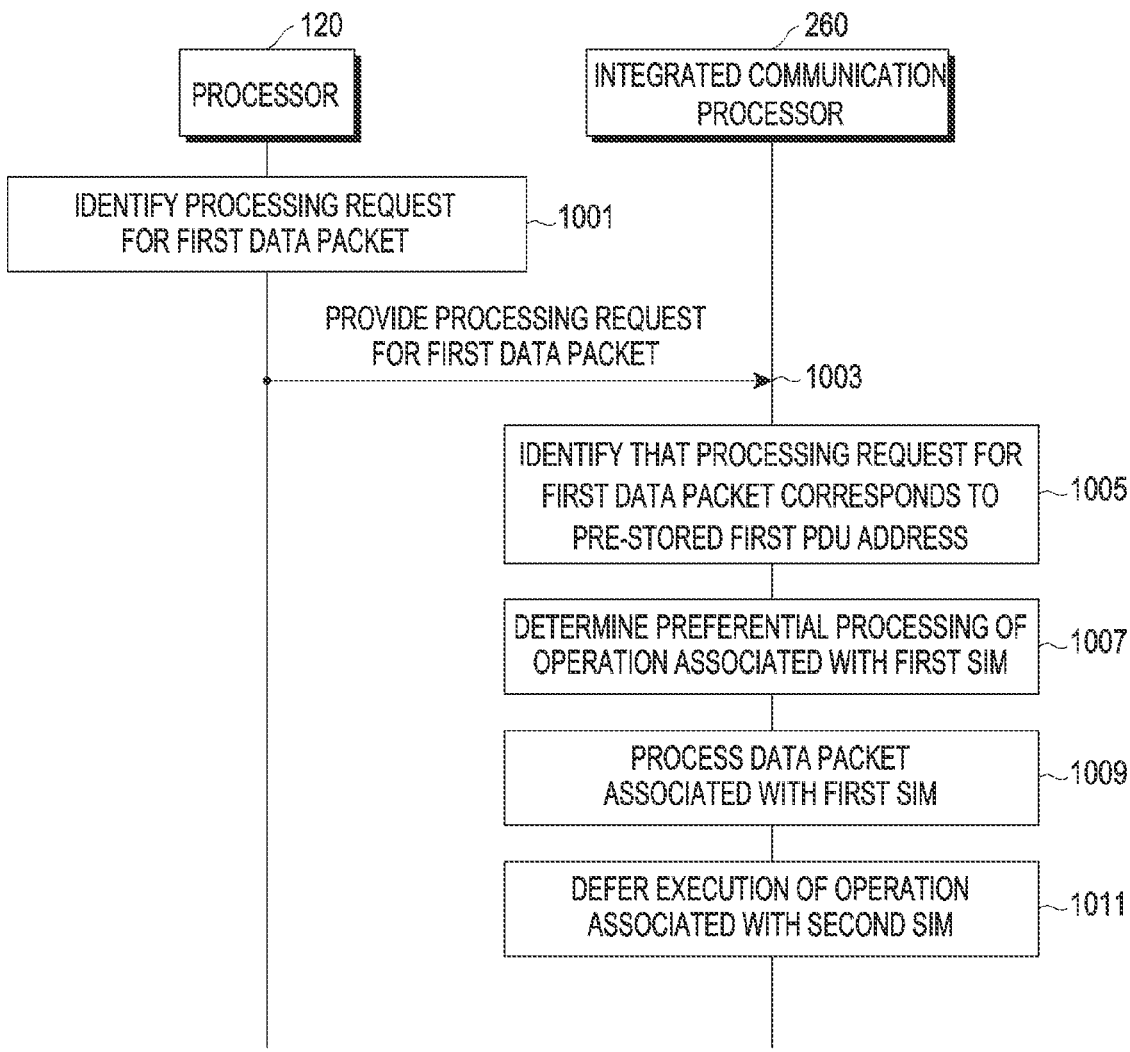
FIG. 10 is a flowchart illustrating example operations of an application processor and an integrated communication processor according to various embodiments.
Figure 11:
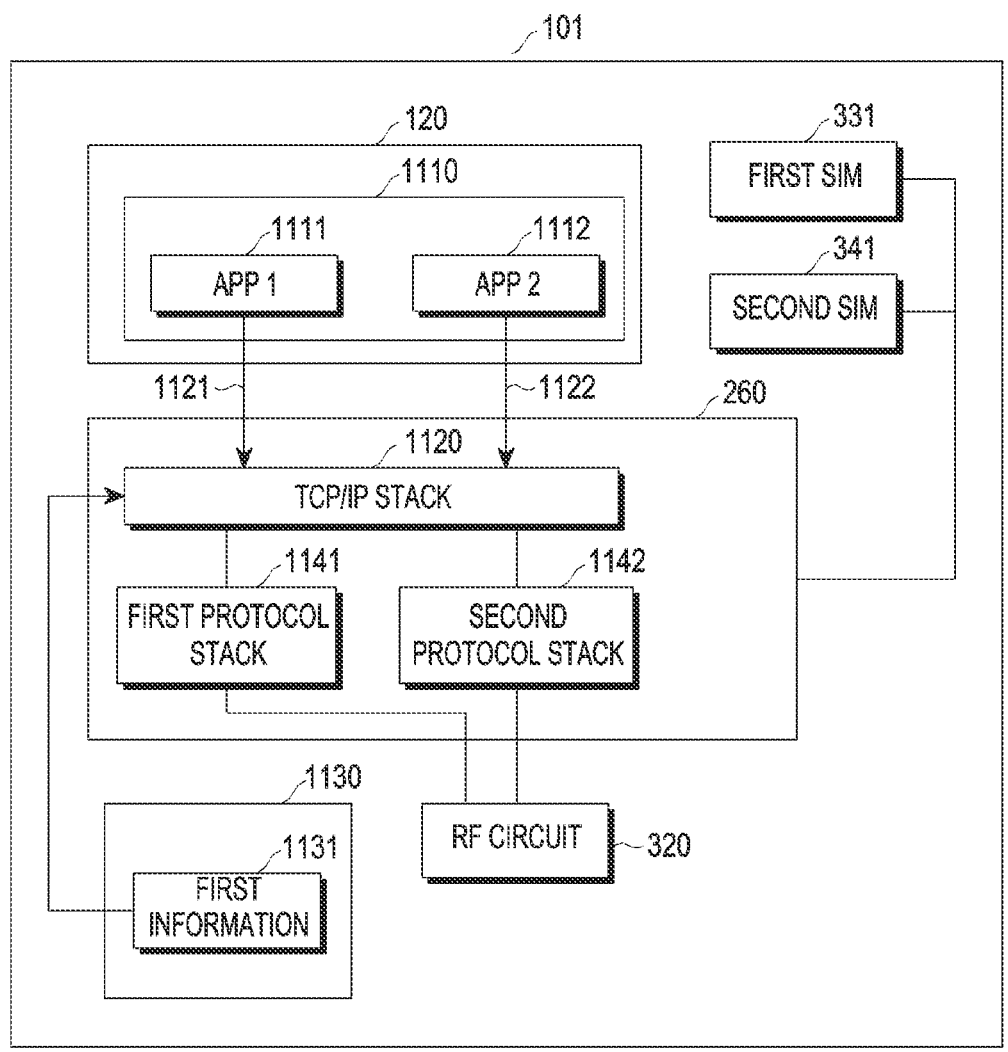
FIG. 11 is a block diagram illustrating an example of an electronic device according to various embodiments.

FIG. 10 is a flowchart illustrating example operations of an application processor and an integrated communication processor according to various embodiments. The embodiment of FIG. 10 is described with reference to FIG. 11. FIG.

11 is a block diagram illustrating an example of an electronic device according to various embodiments.

According to various embodiments, the processor 120 may identify the processing request for the first data packet in operation 1001. In operation 1003, the processor 120 may provide a request for processing the first data packet to the integrated communication processor 260. For example, referring to FIG. 11, an application layer 1110 may be defined in the processor 120. At least one application (e.g., the first application 1111 and the second application 1112) may be executed on the application layer 1110. A TCP/IP stack 1120 and a 3GPP protocol stack (e.g., a first protocol stack 1141 and a second protocol stack 1142) may be defined in the integrated communication processor 260. The TCP/IP stack 1120 may receive data packets from the applications 1111 and 1112. The TCP/IP stack 1120 may receive a first data packet from the first application 1111 through, e.g., a first port 1121 and may receive a second data packet from the second application 1112 through a second port 1122.

According to various embodiments, in operation 1005, the integrated communication processor 260 may identify that the processing request for the first data packet corresponds to the previously stored first PDU address. For example, the TCP/IP stack 1120 may determine whether the source IP address of the data packet for transmission corresponds to the PDU address of the previously stored first information 1131 and/or whether the destination IP address of the data packet for reception corresponds to the PDU address of the previously stored first information 1131. If the processing request for the first data packet corresponds to the previously stored first PDU address, the integrated communication processor 260 may determine preferential processing of the operation associated with the first SIM in operation 1007. In operation 1009, the integrated communication processor 260 may process the data packet associated with the first SIM using the RF circuit 320. The integrated communication processor 260 may defer execution of the operation associated with the second SIM 341 in operation 1011. For example, although requested to use the RF circuit 320 by the second protocol stack 1442 corresponding to the second SIM 341, the integrated communication processor 260 may defer (or disregard) it.

Figure 12:
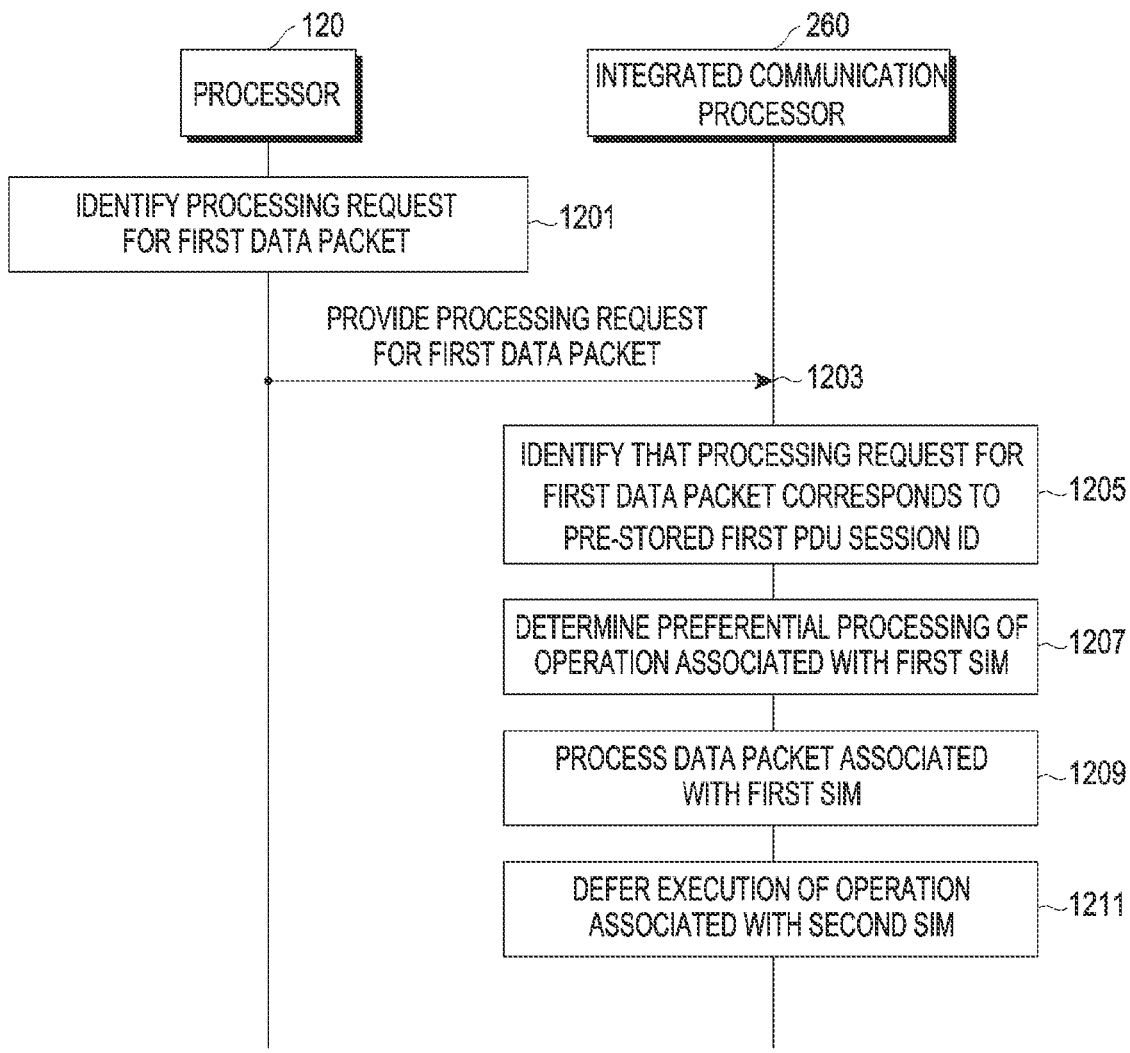
FIG. 12 is a flowchart illustrating example operation method of an application processor and an integrated communication processor according to various embodiments.
Figure 13:
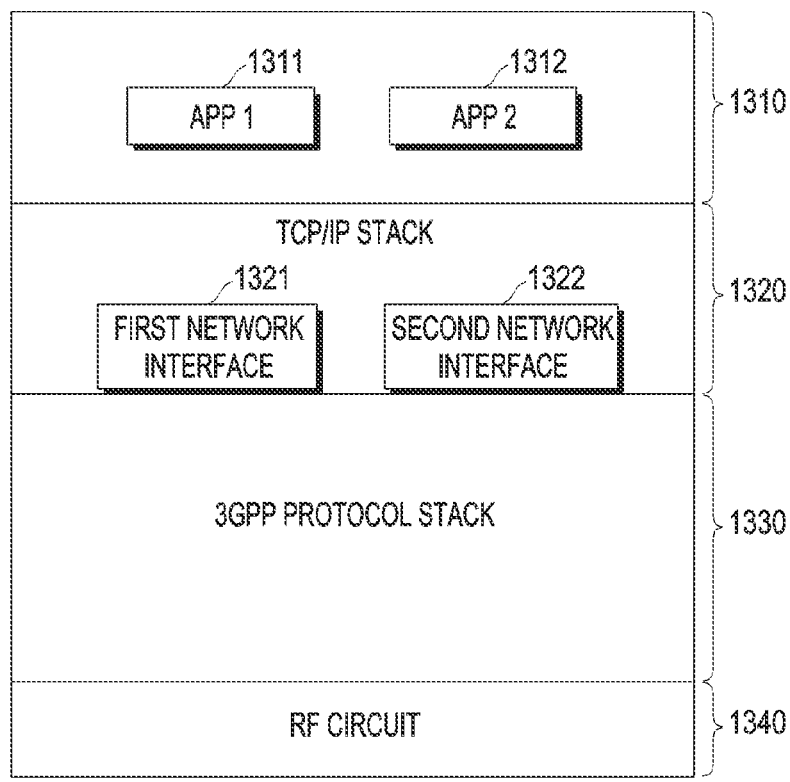
FIG. 13 is a block diagram illustrating an example of an electronic device according to various embodiments.

FIG. 12 is a flowchart illustrating example operations of an application processor and an integrated communication processor according to various embodiments. The embodiment of FIG. 12 is described with reference to FIG. 13. FIG. 13 is a block diagram illustrating an example of an electronic device according to various embodiments.

According to various embodiments, the processor 120 may identify the processing request for the first data packet in operation 1201. For example, referring to FIG. 13, an application layer 1310 may be defined in the electronic device 101 (e.g., the processor 120). At least one application (e.g., the first application 1311 and the second application 1312) may be executed on the application layer 1310. A TCP/IP stack 1320 may be defined in the electronic device 101. The TCP/IP stack 1320 may be defined in at least one of, e.g., the processor 120 and/or the integrated communication processor 260.

According to various embodiments, in operation 1203, the processor 120 may provide a request for processing the first data packet to the integrated communication processor 260. The 3GPP protocol stack 1330 defined in the integrated communication processor 260 may receive a data packet from the TCP/IP stack 1320 through, e.g., the first network interface 1321 and the second network interface 1322. The first network interface 1321 and the second network interface 1322 may be configured for each PDU session, for example. The 3GPP protocol stack 1330 may transmit the data packets provided through the network interfaces 1321 and 1322 through the PDU session corresponding to the network interface. The 3GPP protocol stack 1330 may provide the data packet received through the PDU session to the TCP/IP stack 1320 through the corresponding network interfaces 1321 and 1322.

According to various embodiments, in operation 1205, the integrated communication processor 260 may identify that the processing request for the first data packet corresponds to the previously stored first PDU session identifier. The 3GPP protocol stack 1330 may identify that the PDU session identifier is "3" based on, e.g., the processing request for the data packet corresponding to the first network interface 1321. For example, as in the example of Table 3, the electronic device 101 may previously store PDU session identifiers of "3" and "4" as reference information for preferential processing. The 3GPP protocol stack 1330 defined in the integrated communication processor 260 may refer to association information between the network interfaces 1321 and 1322 and the PDU session identifier. The 3GPP protocol stack 1330 may identify that "3", which is the PDU session identifier, is the same as "3", which is information for reference.

According to various embodiments, in operation 1207, the integrated communication processor 260 may determine preferential processing of the operation associated with the first SIM 331 using the RF circuit 1340, based on the processing request for the first data packet corresponding to the previously stored first PDU session identifier. In operation 1209, the integrated communication processor 260 may process the data packet associated with the first SIM 331 using the RF circuit 1340. The integrated communication processor 260 may defer (or disregard) execution of the operation associated with the second SIM 341 in operation 1211.

Figure 14A:
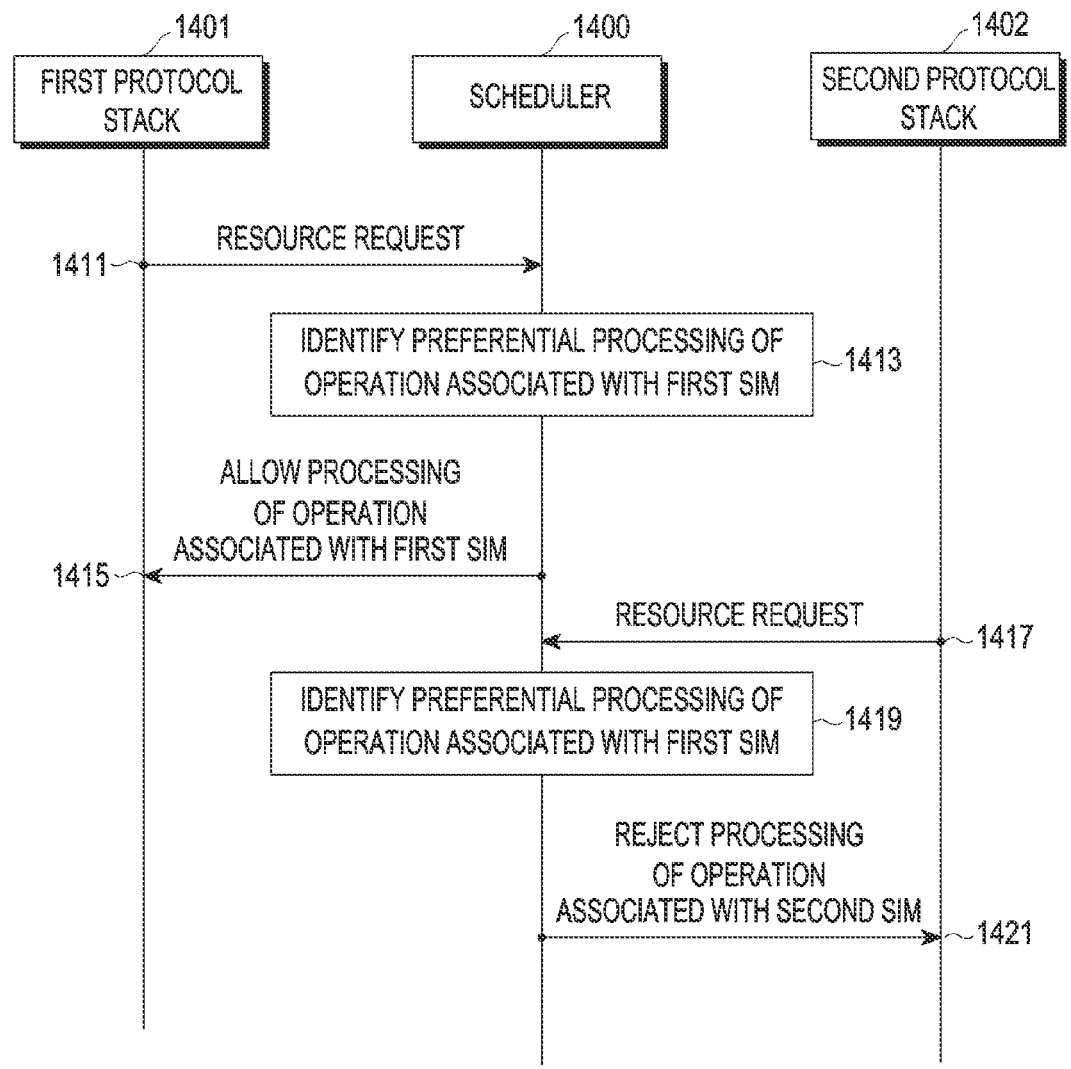
FIG. 14A is a flowchart illustrating example operations of an electronic device according to various embodiments.

FIG. 14A is a flowchart illustrating example operations of an electronic device according to various embodiments.

According to various embodiments, a scheduler 1400, a first protocol stack 1401, and a second protocol stack 1402 may be defined in the communication processor (e.g., at least one of the first communication processor 212, the second communication processor 214, or the integrated communication processor 260) of the electronic device 101. The first protocol stack 1401 may be a set of instructions for performing the operation associated with the first SIM 331, and the second protocol stack 1402 may be a set of instructions for performing the operation associated with the second SIM 341. The scheduler 1400 may set a use authority for each SIM of the RF circuit (e.g., the RF circuit 320) or set a use period for each SIM. For example, if an event associated with a designated network slice type does not occur, the scheduler 1400 may set a use period (or authority) of the RF circuit for each of the first SIM 331 and the second SIM 341 according to the DSDS mode. For example, the scheduler 1400 may set a use period (or authority) of the RF circuit based on a request for each protocol stack.

According to various embodiments, in operation 1411, the first protocol stack 1401 may send a request for the resource of the RF circuit to the scheduler 1400. In operation 1413, the scheduler 1400 may identify preferential processing of the operation associated with the first SIM 331. For example, the scheduler 1400 may identify a request for preferential processing for the operation associated with the first SIM 331 from the TCP/IP stack and/or the 3GPP protocol stack. In various embodiments, the scheduler 1400 may be included in the 3GPP protocol stack and, in this case, the scheduler 1400 may identify a request for preferential processing for the operation associated with the first SIM 331 from the TCP/IP stack or may identify preferential processing for the operation associated with the first SIM 331 based on the PDU session identifier. In operation 1415, the scheduler 1400 may allow processing of the operation associated with the first SIM 331. Accordingly, the operation associated with the first SIM 331 may be performed using the RF circuit 320.

According to various embodiments, in operation 1417, the second protocol stack 1402 may send a request for the resource of the RF circuit to the scheduler 1400. The second protocol stack 1402 may send a request for the resource of the RF circuit to the scheduler 1400 based on the trigger of the signaling associated with the second SIM 341 and/or the processing of the data packet associated with the second SIM 341. In operation 1419, the scheduler 1400 may identify preferential processing of the operation associated with the first SIM 331. In operation 1421, the scheduler 1400 may reject processing of the operation associated with the second SIM 341. Accordingly, interruption of the operation of the first SIM 331 by the operation associated with the second SIM 341 may be prevented and/or avoided. The scheduler 1400 may allow the resource request from the second protocol stack 1402 until it is notified from the first protocol stack 1401 that the processing of the first data packet is complete or after a designated period.

Figure 14B:
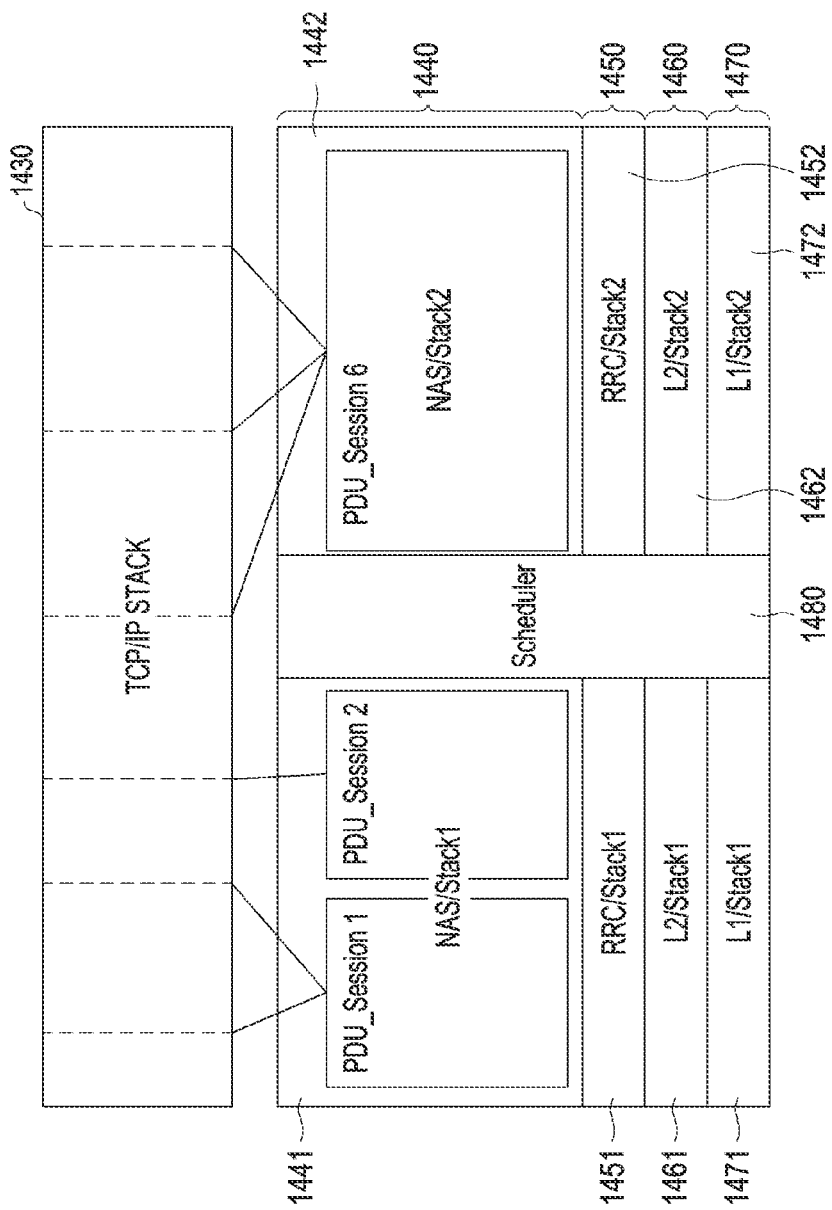
FIG. 14B illustrates an example hierarchy for describing a scheduler according to various embodiments.

FIG. 14B illustrates an example hierarchy for describing a scheduler according to various embodiments.

As in FIG. 14B, the 3GPP protocol may include, e.g., a NAS stack 1440 for a protocol related to the core network, an RRC stack 1450 for a protocol related to wireless communication, an L2 stack 1460, and an L1 stack 1470. For example, corresponding to the first SIM 331, a first NAS stack 1441 (NAS/Stack1), a first RRC stack 1451 (RRC/Stack1), a first L2 stack 1461 (L2/Stack1), and a first L1 stack 1471 (L1/Stack1) may be configured. For example, corresponding to the second SIM 341, a second NAS stack 1442 (NAS/Stack2), a second RRC stack 1452 (RRC/Stack2), a second L2 stack 1462 (L2/Stack2), and a second L1 stack 1472 (L1/Stack2) may be configured. The stacks 1441, 1451, 1461, and 1471 corresponding to the first SIM 331 and the stacks 1442, 1452, 1462 and 1472 corresponding to the second SIM 341 may operate independently.

According to various embodiments, the scheduler 1480 (e.g., the scheduler 1400 of FIG. 14A) may be accessed by the stacks 1441, 1451, 1461, and 1471 corresponding to the first SIM 331 and by the stacks 1442, 1452, 1462, and 1472 corresponding to the second SIM 341. For example, the NAS stacks 1441 and 1442 may send a request for an authority to, and obtain an authority from, the scheduler 1480 based on the information received from the TCP/IP stack 1430. For example, the RC stacks 1451 and 1452 and/or the L1 stacks 1461 and 1462 may send a request for an RF-related control authority, and obtain an RF-related control authority, based on the information received from the TCP/IP stack 1430. There is no limit to the layer in which the scheduler 1480 is positioned.

Figure 15:
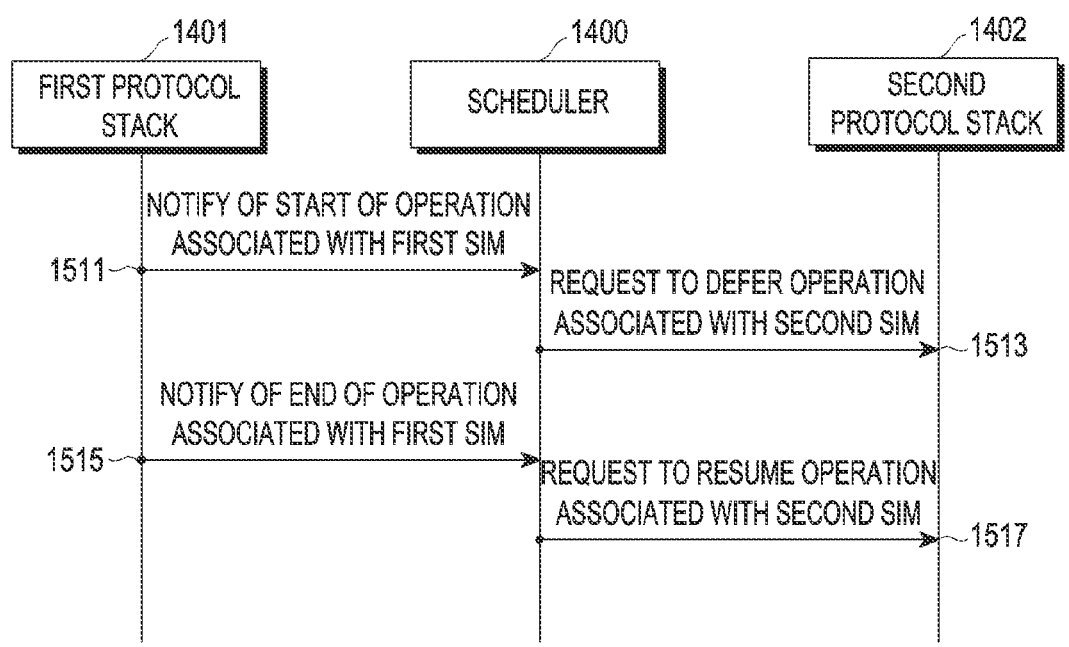
FIG. 15 is a flowchart illustrating example operation method of an electronic device according to various embodiments.

FIG. 15 is a flowchart illustrating example operations of an electronic device according to various embodiments.

According to various embodiments, a scheduler 1400, a first protocol stack 1401, and a second protocol stack 1402 may be defined in the communication processor (e.g., at least one of the first communication processor 212, the second communication processor 214, or the integrated communication processor 260) of the electronic device 101.

The first protocol stack 1401 may notify of the start of an operation associated with the first SIM 331 in operation 1511. The scheduler 1400 may request the second protocol stack 1402 to defer the operation associated with the second SIM 341 in operation 1513. The second protocol stack 1402 may defer the execution of the operation associated with the second SIM 341 based on the request to defer the operation. For example, even when a trigger of processing of the data packet associated with the second SIM 341 and/or signaling associated with the second SIM 341 is detected, the second protocol stack 1402 may not request the resource of the RF circuit 1400. Accordingly, interruption of the operation of the first SIM 331 by the operation associated with the second SIM 341 may be prevented and/or avoided.

According to various embodiments, the first protocol stack 1401 may notify the scheduler 1400 of the end of the operation associated with the first SIM 331 in operation 1515. The scheduler 1400 may request the second protocol stack 1402 to resume the operation associated with the second SIM 1402 in operation 1517. For example, the second protocol stack 1402 may send a request for the resource of the RF circuit 1400 to the scheduler 1400 based on a trigger of the processing of the data packet associated with the second SIM 341 and/or signaling associated with the second SIM 341.

Figure 16:
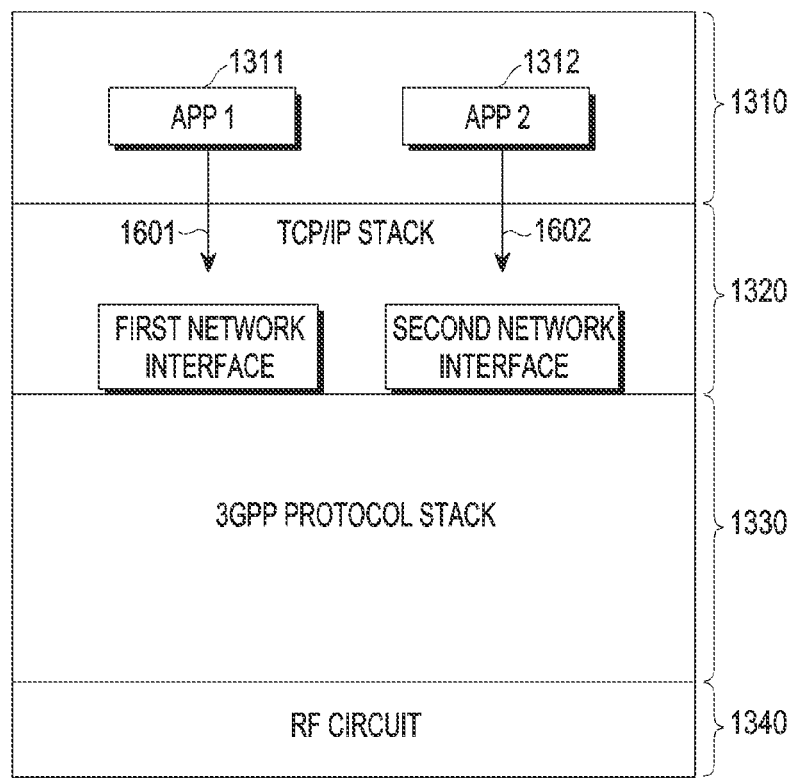
FIG. 16 is a view illustrating an example operation method of operating an electronic device according to various embodiments.

FIG. 16 is a diagram illustrating an example method of operating an electronic device according to various embodiments.

According to various embodiments, an application layer 1310 may be defined in the electronic device 101 (e.g., the processor 120). At least one application (e.g., the first application 1311 and the second application 1312) may be executed on the application layer 1310. A TCP/IP stack 1320 may be defined in the electronic device 101. The TCP/IP stack 1320 may be defined in at least one of, e.g., the processor 120 and/or the integrated communication processor 260.

According to various embodiments, the TCP/IP stack 1320 may receive a first data packet 1601 from a first application 1311 and may receive a second data packet 1602 from a second application 1312. It is assumed that the first PDU session and the second PDU session are established corresponding to the first application 1311 and the second application 1312. The TCP/IP stack 1320 may previously store association information between each application and the network slice type. Table 5 is an example of the association information.

TABLE 5

| application | SST value |
| --- | --- |
| first application | 2 |
| second application | 1 |

Table 5 is merely an example, and the TCP/IP stack 1320 may use the port number instead of the application of Table 4. The TCP/IP stack 1320 may identify that the first data packet 1601 is received from the first application 1311 (or received through the first port) and may thus identify that it corresponds to the SST value of 2. The TCP/IP stack 1320 may identify that the second data packet 1602 is received from the second application 1312 (or received through the second port) and may thus identify that it corresponds to the SST value of 1. The TCP/IC 1320 may provide the first data packet 1601 corresponding to the predesignated SST value (e.g., 2) to the 3GPP protocol stack 1330. The TCP/IC 1320 may defer (or disregard) the provision of the second data packet 1602 that does not correspond to the predesignated SST value (e.g., 2). Thus, the first data packet 1601 may be preferentially processed, and the second data packet 1602 may be then processed. Further, a designated type of service may be performed without interruption. An electronic device may comprise at least one processor, and an RF circuit configured to process a data packet associated with a first SIM connected to the at least one processor and a data packet associated with a second SIM connected to the at least one processor. The at least one processor may be configured to establish a first PDU session corresponding to the first SIM, establish a second PDU session corresponding to the second SIM, store first information for the first PDU session, based on a network slice type of the first PDU session being a predesignated first type, and process a first data packet associated with the first SIM using the RF circuit while deferring execution of an operation associated with the second SIM, based on a processing request for the first data packet associated with the first SIM corresponding to the stored first information.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to identify an IP address associated with processing of the first data packet, and identify that the IP address corresponds to at least one PDU address of the stored first information.

According to an example of various embodiments, the at least one processor may be configured to store the at least one PDU address, based on an SST value included in a PDU session establishment accept message corresponding to the first PDU session being at least one predesignated value.

According to an example of various embodiments, the at least one processor may be configured to receive the processing request for the first data packet through a first port from a first application associated with the first SIM, based on a TCP/IP stack and identify an IP address associated with the processing of the first data packet based on the first port, based on the TCP/IP stack. The first port may be used for data packet transmission/reception between an application layer, where the first application is executed, and the TCP/IP stack.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to request a 3GPP protocol stack to preferentially process the first data packet, based on the TCP/IP stack, and defer execution of an operation associated with the second SIM while processing the first data packet using the RF circuit, based on the 3GPP protocol stack.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to identify that a PDU session identifier associated with the processing of the first data packet corresponds to at least one PDU session identifier of the stored first information.

According to an example of various embodiments, the at least one processor may be configured to store the at least one PDU session identifier, based on an SST value included in a PDU session establishment accept message corresponding to the first PDU session being at least one predesignated value.

According to an example of various embodiments, the at least one processor may be configured to receive the processing request for the first data packet through a first network interface from a TCP/IP stack, based on a 3GPP protocol stack, and identify a PDU session identifier associated with the processing of the first data packet based on the first network interface, based on the 3GPP protocol stack. The first network interface may be used for data packet transmission/reception between the 3GPP protocol stack and the TCP/IP stack.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to defer a processing request for a second data packet associated with the second SIM and/or a signaling operation associated with the second SIM.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to reject a request for a resource of the RF circuit from a protocol stack associated with the second SIM and/or request the protocol stack associated with the second SIM to defer an operation associated with the second SIM.

According to an example of various embodiments, the at least one processor may be configured to stop deferring execution of an operation associated with the second SIM based on expiration of a designated time and/or completion of processing of the first data packet.

According to an example of various embodiments, as at least part of processing the first data packet associated with the first SIM using the RF circuit while deferring execution of the operation associated with the second SIM, based on the processing request for the first data packet associated with the first SIM corresponding to the stored first information, the at least one processor may be configured to, upon receiving the processing request for the first data packet and a processing request for a second data packet associated with the second SIM, process the first data packet associated with the first SIM corresponding to the stored first information and then process the second data packet.

According to an example of various embodiments, as at least part of processing the first data packet associated with the first SIM corresponding to the stored information and then processing the second data packet, the at least one processor may be configured to, based on a first application providing the first data packet corresponding to the first information, process the first data packet associated with the first SIM corresponding to the stored first information and then process the second data packet.

According to an example of various embodiments, a method of operating an electronic device including at least one processor and an RF circuit configured to process a data packet associated with a first SIM connected to the at least one processor and a data packet associated with a second SIM connected to the at least one processor may comprise: establishing a first PDU session corresponding to the first SIM, establishing a second PDU session corresponding to the second SIM, storing first information for the first PDU session based on a network slice type of the first PDU session being a predesignated first type, and processing a first data packet associated with the first SIM using the RF circuit while deferring execution of an operation associated with the second SIM based on a processing request for the first data packet associated with the first SIM corresponding to the stored first information.

According to an example of various embodiments, processing the first data packet associated with the first SIM using the RF circuit while deferring execution of the operation associated with the second SIM, based on the processing request for the first data packet associated with the first SIM corresponding to the stored first information may include: identifying an IP address associated with processing of the first data packet, and identifying that the IP address corresponds to at least one PDU address of the stored first information.

According to an example of various embodiments, the method may further comprise: storing the at least one PDU session identifier based on an SST value included in a PDU session establishment accept message corresponding to the first PDU session being at least one predesignated value.

According to an example of various embodiments, the method may further comprise: receiving the processing request for the first data packet through a first port from a first application associated with the first SIM, based on a TCP/IP stack and identifying an IP address associated with the processing of the first data packet based on the first port, based on the TCP/IP stack. The first port may be used for data packet transmission/reception between an application layer, where the first application is executed, and the TCP/IP stack.

According to an example of various embodiments, processing the first data packet associated with the first SIM using the RF circuit while deferring execution of the operation associated with the second SIM, based on the processing request for the first data packet associated with the first SIM corresponding to the stored first information may include: requesting a 3GPP protocol stack to preferentially process the first data packet, based on the TCP/IP stack and deferring execution of an operation associated with the second SIM while processing the first data packet using the RF circuit, based on the 3GPP protocol stack.

According to an example of various embodiments, processing the first data packet associated with the first SIM using the RF circuit while deferring execution of the operation associated with the second SIM, based on the processing request for the first data packet associated with the first SIM corresponding to the stored first information may include identifying that a PDU session identifier associated with the processing of the first data packet corresponds to at least one PDU session identifier of the stored first information.

According to an example of various embodiments, the method may further comprise receiving the processing request for the first data packet through a first network interface from a TCP/IP stack, based on a 3GPP protocol stack, and identifying a PDU session identifier associated with the processing of the first data packet based on the first network interface, based on the 3GPP protocol stack. The first network interface may be used for data packet transmission/reception between the 3GPP protocol stack and the TCP/IP stack.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to the various embodiments, it will be understood that the various embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   at least one processor, and
   a radio frequency (RF) circuit configured to process a data packet associated with a first subscriber identification module (SIM) and a data packet associated with a second SIM,
   memory storing instructions that, when executed by the at least one processor, cause the electronic device to:
   establish a first packet data unit (PDU) session corresponding to the first SIM,
   establish a second PDU session corresponding to the second SIM,
   obtain a first information on the first PDU session, wherein the first information on the first PDU session includes a network slice type of the first PDU session and a first IP address corresponds to an IP address of the first PDU session,
   process a first data packet associated with the first IP address using the RF circuit while deferring execution of an operation associated with the second SIM based on the network slice type of the first PDU session corresponding to a specified network slice type, wherein the specified network slice type includes an Ultra-Reliable and Low-Latency Communications (URLLC).

2. The electronic device of claim 1, wherein the instructions further include an instruction that, when executed by the at least one processor, cause the electronic device to:
   identify the first IP address associated with processing of the first data packet, and
   identify that the first IP address corresponds to at least one PDU address of the first information.

3. The electronic device of claim 2, wherein the instructions further include an instruction that, when executed by the at least one processor, cause the electronic device to:
   store the at least one PDU address, based on a slice/service type (SST) value included in a PDU session establishment accept message corresponding to the first PDU session being at least one specified value.

4. The electronic device of claim 2, wherein the instructions further include an instruction that, when executed by the at least one processor, cause the electronic device to:
   receive a processing request for the first data packet through a first port from a first application associated with the first SIM, based on a TCP/IP stack, the first port used for data packet transmission/reception between an application layer, where the first application is executed, and the TCP/IP stack, and
   identify an IP address associated with the processing of the first data packet based on the first port, based on the TCP/IP stack.

5. The electronic device of claim 4, wherein the instructions further include an instruction that, when executed by the at least one processor, cause the electronic device to:
   request a 3GPP protocol stack to preferentially process the first data packet based on the TCP/IP stack, and
   defer execution of an operation associated with the second SIM while processing the first data packet using the RF circuit based on the 3GPP protocol stack.

6. The electronic device of claim 1, wherein the instructions further include an instruction that, when executed by the at least one processor, cause the electronic device to:
   identify that a PDU session identifier associated with the processing of the first data packet corresponds to at least one PDU session identifier of a stored first information in the electronic device.

7. The electronic device of claim 6, wherein the instructions further include an instruction that, when executed by the at least one processor, cause the electronic device to:
   store the at least one PDU session identifier based on an SST value included in a PDU session establishment accept message corresponding to the first PDU session being at least one specified value.

8. The electronic device of claim 6, wherein the instructions further include an instruction that, when executed by the at least one processor, cause the electronic device to:
   receive a processing request for the first data packet through a first network interface from a TCP/IP stack, based on a 3GPP protocol stack, the first network interface used for data packet transmission/reception between the 3GPP protocol stack and the TCP/IP stack, and
   identify a PDU session identifier associated with the processing of the first data packet based on the first network interface, based on the 3GPP protocol stack.

9. The electronic device of claim 1, wherein the instructions further include an instruction that, when executed by the at least one processor, cause the electronic device to:
   defer a processing request for a second data packet associated with the second SIM and/or a signaling operation associated with the second SIM.

10. The electronic device of claim 1, wherein the instructions further include an instruction that, when executed by the at least one processor, cause the electronic device to: reject a request for a resource of the RF circuit from a protocol stack associated with the second SIM and/or request the protocol stack associated with the second SIM to defer an operation associated with the second SIM.

11. The electronic device of claim 1, wherein the instructions further include an instruction that, when executed by the at least one processor, cause the electronic device to: stop deferring execution of an operation associated with the second SIM based on expiration of a designated time and/or completion of processing of the first data packet.

12. The electronic device of claim 1, wherein the instructions further include an instruction that, when executed by the at least one processor, cause the electronic device to: based on a first application providing the first data packet corresponding to the first information, process the first data packet associated with the first SIM corresponding to a stored information in the electronic device and then process the second data packet.

13. A method of operating an electronic device, the electronic device including at least one processor and a radio frequency (RF) circuit configured to process a data packet associated with a first subscriber identification module (SIM) connected to the at least one processor and a data packet associated with a second SIM connected to the at least one processor, the method comprising:
    establishing a first packet data unit (PDU) session corresponding to the first SIM;
    establishing a second PDU session corresponding to the second SIM;
    obtaining a first information on the first PDU session, wherein the first information on the first PDU session includes a network slice type of the first PDU session and a first IP address corresponds to an IP address of the first PDU session,
    processing a first data packet associated with the first IP address using the RF circuit while deferring execution of an operation associated with the second SIM based on the network slice type of the first PDU session corresponding to a specified network slice type, wherein the specified network slice type includes an Ultra-Reliable and Low-Latency Communications (URLLC).

14. The method of claim 13, wherein the method is further comprising:
    identifying the first IP address associated with processing of the first data packet, and
    identifying that the first IP address corresponds to at least one PDU address of the first information.

* * * * *